United States Patent [19]
Yu et al.

[11] Patent Number: 5,805,817
[45] Date of Patent: Sep. 8, 1998

[54] METHOD AND DEVICE FOR SETTING TERMINAL STATE AND ASSIGNING ID NUMBER FOR CONCENTRATOR

[75] Inventors: Ji-Hsiang Yu; Wen-Hsung Huang, both of Hsinchu, Taiwan

[73] Assignee: Accton Technology Corporation, Hsinchu, Taiwan

[21] Appl. No.: 614,734

[22] Filed: Mar. 13, 1996

Related U.S. Application Data

[63] Continuation-in-part of Ser. No. 353,831, Dec. 12, 1994, abandoned.

[51] Int. Cl.$^6$ .................................................. G06F 13/00
[52] U.S. Cl. ...................................... 395/200.54; 370/434
[58] Field of Search ........................ 395/200.54, 200.64, 395/200.65; 370/434, 218, 221, 235

[56] References Cited

U.S. PATENT DOCUMENTS

| | | | |
|---|---|---|---|
| 4,352,103 | 9/1982 | Slater | 340/825.01 |
| 4,623,884 | 11/1986 | Ihara et al. | 340/825.05 |
| 4,730,251 | 3/1988 | Aakre et al. | 395/284 |
| 4,777,330 | 10/1988 | Nakayashiki et al. | 371/20.6 |
| 4,847,611 | 7/1989 | Bekki et al. | 370/224 |
| 4,899,142 | 2/1990 | Nakayashiki et al. | 340/825.05 |
| 4,974,190 | 11/1990 | Curtis | 364/900 |
| 5,204,669 | 4/1993 | Dorfe et al. | 327/427 |
| 5,282,237 | 1/1994 | Babu et al. | 370/224 |
| 5,303,387 | 4/1994 | Millard et al. | 395/200.81 |
| 5,341,400 | 8/1994 | Davis | 375/256 |
| 5,394,401 | 2/1995 | Patrick et al. | 370/434 |
| 5,420,986 | 5/1995 | Baldwin et al. | 395/311 |

*Primary Examiner*—Moustafa M. Meky
*Attorney, Agent, or Firm*—Frost & Jacobs LLP

[57] ABSTRACT

A method of setting terminal state and assigning ID number for stack network concentrators, and a device executing the method are provided. A terminal state setting is executed when a concentrator detects that there is no electric signal, through one of it's I/O ports, coming from its adjacent counterpart. A device for implementing such execution includes a first power source generator, a first power source detector, a second power source generator and a second power source detector. Steps for implementing the ID number assignment includes: a) causing two I/O ports of each concentrator in an open state, b) sequentially assigning distinctive ID numbers respectively for the concentrator, and simultaneously causing two I/O ports of the one concentrator having been assigned ID number in connecting state, and c) reiteratively executing step b) until all concentrators have been assigned ID numbers respectively. A device for implementing the above steps includes a network agent, a plurality of pairs of switches and multiple transceivers in order to assign ID numbers respectively for concentrators in a network system with stackable concentrators.

28 Claims, 25 Drawing Sheets

METHOD AND DEVICE FOR SETTING TERMINAL STATE AND ASSIGNING ID NUMBER FOR CONCENTRATOR

The present invention is a CIP application of the parent application bearing the Ser. No. 08/353,831 and filed on Dec. 12, 1994, now abandoned.

FIELD OF THE INVENTION

The present invention relates to a method for setting terminal states and assigning ID numbers for concentrators, and more particularly to a method used in a network system with stackable concentrators.

BACKGROUND OF THE INVENTION

In a network system with stackable concentrators, two general architectures are chassis one and stack one which are centralized architecture and distributed architecture, respectively. FIG. 1 is a schematic view of a network system with stackable concentrators which includes plural, e.g. five concentrators C1–C5 that are connected into a network system with a transmission cable (e.g. DB50 cable, UTP cable . . . etc.). Since concentrators C1–C5 are connected with a transmission cable, it is necessary to set a terminator for the terminal of one concentrator that is in an end position in order to reach an impedance match which prevents the network system from being interfered due to the signal reflection that results in a poor transmission quality.

The conventional method for setting terminators for concentrators is manually performed. Specifically, after the network system with stackable concentrators is initiated, concentrators at two terminals of the network system are manually located and are set to be in terminal state. Drawbacks in such conventional methods include:

1. Since stackable concentrators of a network system are located in different positions, manually setting terminal states and assigning ID numbers will be manpower- and time-consuming.
2. The situation may be that not all the stackable concentrators of a network system will be in power-on state. If, whenever, the number of the power-on concentrators under two situations of the system are different, then the previous terminal state setting has to be changed before restarting the system. This is to be performed manually and is very inconvenient.

Further, for the convenient control of the network system with stackable concentrators, every concentrator should possess an individual ID number. The conventional method manually assigns ID numbers for concentrators through their respective manual switches. For example, there are five stackable concentrators C1–C5 with respective ID numbers 1, 2, 3, 4 and 5 in FIG. 1. For these five concentrators to be assigned with ID numbers, a user has to drive manual switches of concentrators to correct positions respectively. Drawbacks in this method may include:

1. It is necessary for the ID number setting agent to memorize the previous ID number of each concentrator, so that the same ID number will not be repeatedly used, which is very inconvenient and easy to go wrong.
2. When the number and the position of the concentrators are changed, their ID numbers must also be changed. The user has to respectively re-switch these concentrators laboriously from the first one to the last one in order to complete the ID number assignment for the system, which is very manpower- and time-consuming.

The relevant prior art corresponding to the present invention includes:

(1) U.S. Pat. No. 5,341,400 entitled "Method And Apparatus For Automatically Sensing And Configuring A Termination In A Bus-Based Network" issued to Davis, and referred as Ref. 1 accordingly hereinafter;
(2) U.S. Pat. No. 5,204,669 entitled "Automatic Station Identification Where Function Modules Automatically Initialize" issued to Dorfe et al., and referred as Ref. 2 accordingly hereinafter;
(3) U.S. Pat. No. 4,730,251 entitled "Automatic I/O Address Assignment" issued to Aakre et al., and referred as Ref. 3 accordingly hereinafter;
(4) U.S. Pat. No. 4,623,884 entitled "Transmission Line Control System With By-Pass Control" issued to Ihara et al., and referred as Ref. 4 accordingly hereinafter;
(5) U.S. Pat. No. 4,899,142 entitled "Ring Networks System And Configuration Control Method" issued to Nakayashiki et al., and referred as Ref. 5 accordingly hereinafter;
(6) U.S. Pat. No. 4,352,103 entitled "Industrial Control System" issued to Slater, and referred as Ref. 6 accordingly hereinafter;
(7) U.S. Pat. No. 4,974,190 entitled "Pass-Through And Isolation Switch" issued to Curtis, and referred as Ref. 7 accordingly hereinafter;

Ref. 1 discloses a method and apparatus for automatically detecting a termination of a network, wherein a TCHAIN is employed as a control input for determining whether a local unit is a terminator or not. As disclosed by this method, if the local unit under detection is not in a terminal state, then TCHAIN is going to connect with the GND (GROUND) of another unit. Accordingly, this makes the buffer of this detected unit disable and the reference voltage cannot drive the matched impedance load resistor, wherein the matched impedance load resistor is used for setting this detected local unit in the terminal state.

However, contrary to the fact that a GND signal is employed to control another unit's terminal matching resistance as described in Ref. 1, the concept disclosed in the present invention is that, a current source and a sensor are included in a single unit, and the sensor is employed for detecting the current source of another unit in order to confirm whether the unit itself is in the terminal state.

Therefore, the distinguishing feature of present invention from the prior art is that a carrier of the DC signal source is invented, wherein the data information signal is capable of being transmitted by over two channels L1 and L2 of the carrier, which means that L1 and L2 are not only employed for communicating in Auto-Terminator-Setting but also utilized for auto-ID assignment.

Ref. 2 discloses an automatic station identification of function modules used in a network, wherein 8 channels of wires for communication are necessary for the techniques employed in that invention, which are SERIAL DATA BUS 22, TERMINATION BUS 51, AENout/AENin 18 and AENrtn 20, as shown in FIGS. 1 & 2. In addition, these 4 pairs wires are absolutely impossible to be reduced to barely employ one single pair wires keeping the function modules functionable as in the present invention. Hence it is totally a different design concept from that of the present invention.

Accordingly, the present invention is not a result obtainable by combining the techniques of the automatically termination detection disclosed by Ref. 1 together with the automatic station identification disclosed by Ref. 2.

The major distinguishing feature of the present invention from prior art is that, the function of Auto-Terminator Detection and auto-ID assignment is capable of being completed merely by utilizing one single pair of communication wires. On the contrary, if the present invention is a combination of Ref. 1 and Ref. 2, then the communication wires employed in present invention will certainly exceed 8 wires, due to some certain wires employed in Ref. 1 together with 8 wires used in Ref. 2 both of which have to be utilized simultaneously.

Therefore, the present invention is a result of comprising new concept and new technology, namely "accomplishing Auto-Terminator Detection and auto-ID assignment over two wires", thereby only the present invention is able to be implemented by using TP (Tristed Pair) cable (comprising 2~8 wires), which is frequently utilized by LAN.

SUMMARY OF THE INVENTION

The purpose of the present invention is to provide method and device for automatically setting the terminal states and ID numbers of the stackable concentrators of network system, which are more manpower-and time-saving than that of prior art.

In accordance with the present invention, a method for setting a terminal state for a concentrator in a network system including a plurality of stackable concentrators each of which has two I/O ports comprising automatically setting terminal state for one of the two I/O ports of the concentrator when this concentrator detects there is no electric signal passing through one of the I/O ports.

In accordance with the present invention, the method further includes steps of:

a) causing the two I/O ports of each of the plurality of stackable concentrators including a master one in a mutually open state, b) sequentially assigning distinctive ID numbers respectively for the concentrators from the master one to adjacent ones, and simultaneously causing the two I/O ports of one of the concentrators which has been assigned with one of the ID numbers in a mutually connecting state, and c) reiteratively executing step b) until all of the plurality of concentrators have been assigned with ID numbers respectively.

In executing step b) of the above method, for a specific concentrator without an ID number, one of the distinctive ID numbers will be assigned for a specific concentrator; while for a particular concentrator with an ID number different from one of the distinctive ID numbers to be newly assigned thereto, then let the particular concentrator maintain its original ID number. Alternatively, if so desired, for a particular concentrator with an original ID number different from one of the distinctive ID numbers to be anew assigned thereto, we can set the particular concentrator to accept the anew assigned ID number.

In accordance with the present invention, a device for implementing the previous method includes a plurality of first power source generators respectively located in a plurality of concentrators in order to provide through a first I/O port of a first active concentrator of the plurality of concentrators in power-on state for a first adjacent concentrator an electric source, a plurality of first power source detectors respectively located in a plurality of concentrators for detecting whether there is an electric signal provided from the first adjacent concentrator into the first I/O port of the first active concentrator, a plurality of second power source generators located respectively in a plurality of concentrators in order to provide through a second VO port of a second active concentrator of the plurality of concentrator in power-on state for a second adjacent concentrator an electric source, a plurality of second power source detectors located respectively in a plurality of concentrators for detecting whether there is an electric signal power source provided from a second adjacent concentrator into the second I/O port of the second active concentrator, a plurality of pairs of switches positioned in the plurality of concentrators respectively and each pair of which includes a first one connected between the first power source generator and the second power source detector of the respective concentrator and a second one between the first detector and the second generator of the respective concentrator in order to determine these two I/O ports of the respective concentrator in one of open state and connecting state, the master one serving as a network agent device respectively assigning the ID numbers to other concentrators by alternating current signals, e.g. a signal of communication protocol, a plurality of pairs of transceivers located respectively in a plurality of concentrators for execution according to the communication protocol, and a plurality of pairs of isolators mounted in a plurality of concentrators respectively and each pair of which includes a first one connected between the respective first electric source detector and one of the respective pair of transceivers and a second one between the one transceiver and the respective first power source generator to prevent the one transceiver from receiving a non-alternating signal. A network agent further includes one memory unit to memorize assigned ID numbers of concentrators in order to prevent ID numbers from being repeatedly assigned.

In accordance with another aspect of the present invention, each of the first power source generators is a voltage or a current source, each of the first power source detectors is a voltage or a current detector, each of the second power source generators is a voltage or a current source, and each of the second power electric source detectors is a voltage or a current detector.

In accordance with a further aspect of the present invention, a device mounted in each concentrator mentioned above further includes a first power source generator, when in power-on state, through a first one of its two I/O ports providing a first one of the concentrators adjacent to the concentrator a power source, a first power source detector detecting whether there is an electric signal provided from the first adjacent concentrator into the first I/O port, a second power source generator, when in power-on state, through a second one of its two I/O ports providing a second one of the concentrators adjacent to the each concentrator a power source, a second power source detector detecting whether there is an electric signal provided from the second adjacent concentrator into the second I/O port, and two switches respectively connected between the first power source generator and the second power source detector and between the first power source detector and the second power source generator in order to determine the two I/O ports in one of a mutually open state and a mutually connecting state.

In accordance with a further aspect of the present invention, the first power source generator is a current source or a voltage source, the first power source detector is a current detector or a voltage detector, the second power source generator is a voltage or a current source, and the second power source detector is a voltage or a current detector.

In accordance with a further aspect of the present invention, a method for respectively assigning ID numbers to a plurality of concentrators each of which has two I/O ports in a network including steps of: a) causing the two I/O ports of each of the plurality of stackable concentrators including a master one in a mutually open state, b) sequentially assigning distinctive ID numbers respectively for the concentrators from the master one to adjacent ones, and simultaneously causing the two I/O ports of one of the concentrators which has been assigned with one of the ID numbers in a mutually connecting state, and c) reiteratively executing step b) until all of the plurality of concentrators have been assigned with ID numbers respectively.

In executing step b) of the above method, for a specific concentrator without an ID number, one of the distinctive ID numbers will be assigned for a specific concentrator; while for a particular concentrator with an ID number different from one of the distinctive ID numbers to be newly assigned thereto, then let the particular concentrator maintain its ID number. Alternatively, if so desired, for a particular concentrator with an ID number different from one of the distinctive ID numbers to be anew assigned thereto, we can set the particular concentrator to accept the anew assigned ID number.

In accordance with a further aspect of the present invention, a device for implementing the mentioned preceding method includes a network agent device being one of the plurality of concentrators for respectively assigning ID numbers to other concentrators by signals, e.g. alternating current signals, representative of a communication protocol, a plurality of pairs of switches respectively mounted in each of the plurality of concentrators for respectively determining the two I/O ports of the plurality of concentrators in mutually open state and mutually connecting state, and a plurality of pairs of transceivers located respectively in each of the plurality of concentrators for execution according to the communication protocol. A network agent further includes one memory unit to memorize assigned ID numbers of concentrators in order to prevent ID numbers from being repeatedly assigned.

The present invention may best be understood through the following description with reference to the accompanying drawings, in which:

DETAILED DESCRIPTION OF THE PREFERRED EMBODIMENT

Figure 1:
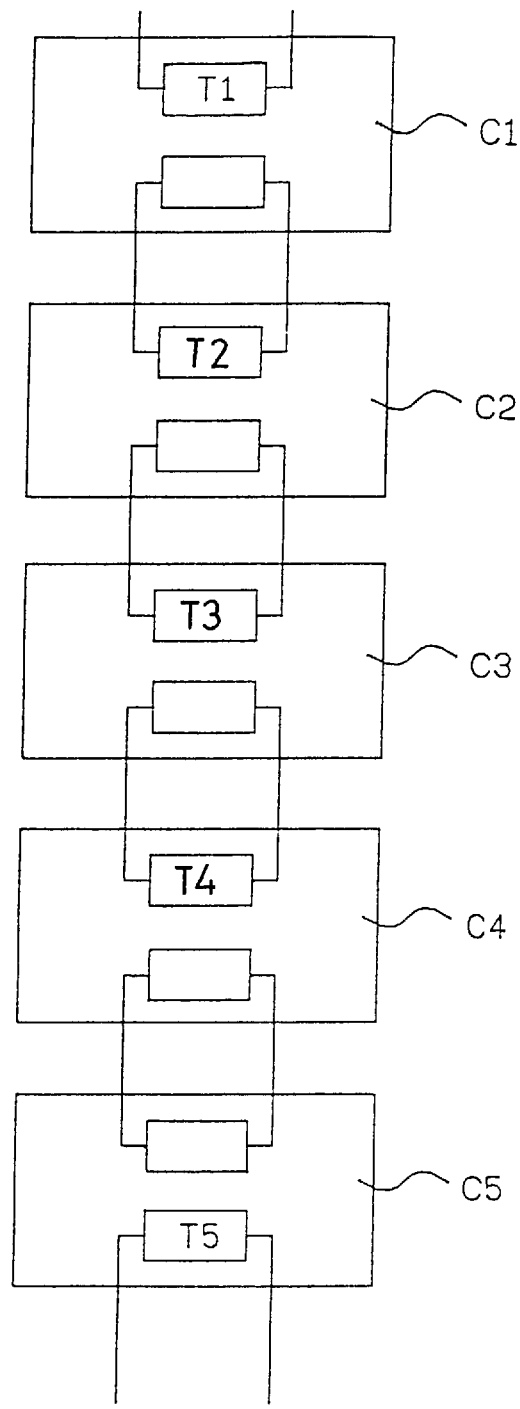
FIG. 1 is a schematic view showing the connection of a network system with stackable concentrators.
Figure 2:
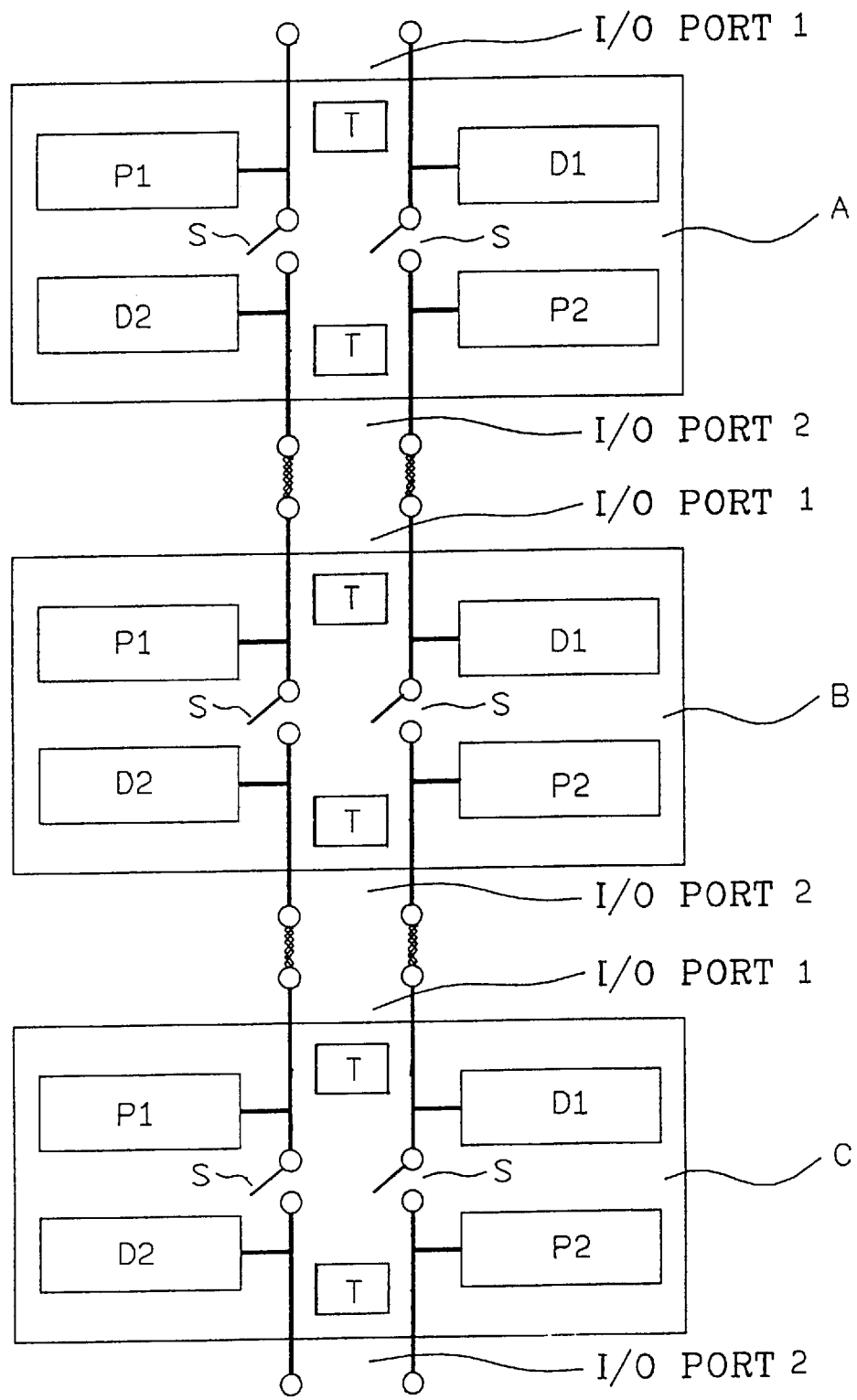
FIG. 2 is a schematic view showing a preferred embodiment of a network system with stackable concentrators for setting terminal state of the concentrator in a first state.

Referring to FIG. 2 which is a schematic view of a preferred embodiment of a network system with stackable concentrators for setting terminal states of the concentrators. Each of the concentrators A, B and C includes a first I/O port 1, a second I/O port 2 and a terminal setter T. The I/O port 1 connects thereto the first power source generator P1 and the first power source detector D1; while the I/O port 2 connects thereto the second power source generator P2 and the second power source detector D2. Further, when the concentrator is in power-on state which corresponds to an open state of the switch S. The concentrator in power-off state is corresponding to a closed state of the switch S. Some states of the present system will be described in the following:

1. The concentrators A, B and C are all in power-on state:

Referring to FIG. 2, due to the fact that all concentrators A, B and C are in power-on state, all switches S of concentrators A, B and C are in open state. So far as I/O port 1 of the concentrator B is concerned, when the concentrator A is in power-on state, the second power source generator P2 of the concentrator A will send out an electric signal to the first power source detector D1 of the concentrator B. When the first power source detector D1 of the concentrator B detects a signal transmitted from the second power source generator P2 of the concentrator A, it represents that the I/O port 1 of the concentrator B is connected with another concentrator. By the same token, as for the I/O port 2 of concentrator A, when the concentrator B is in power-on state, the first power source generator P1 of concentrator B will provide a power source to the second power source detector D2 of concentrator A detects a power source supplied from the first power source generator P1 of the concentrator B, it represents that the I/O port 2 of the concentrator A is connected with another concentrator. So, the I/O port 2 of the concentrator A is not in a terminal state. So far as the I/O port 1 of the concentrator A is taken into account, if the first power source detector D1 of the concentrator A detects no electric signal due to the I/O port 1 of the concentrator A being not in connection with other concentrators, then the I/O port 1 of the concentrator A is sure to be in a terminal state, the concentrator A will turn on the terminal setter T of its I/O port 1. Consequently, we can similarly ascertain that the I/O port 2 of the concentrator B and the I/O port 1 of the concentrator C are not in a terminal state; while the I/O port 2 of the concentrator C is in a terminal state. In sum, when a power source detector connected to an I/O port detects an external coming electric signal, it represents that the I/O port is not in a terminal state; while if the power source detector detects no electric signal, then that particular I/O port is sure to be in a terminal state.

Figure 3:
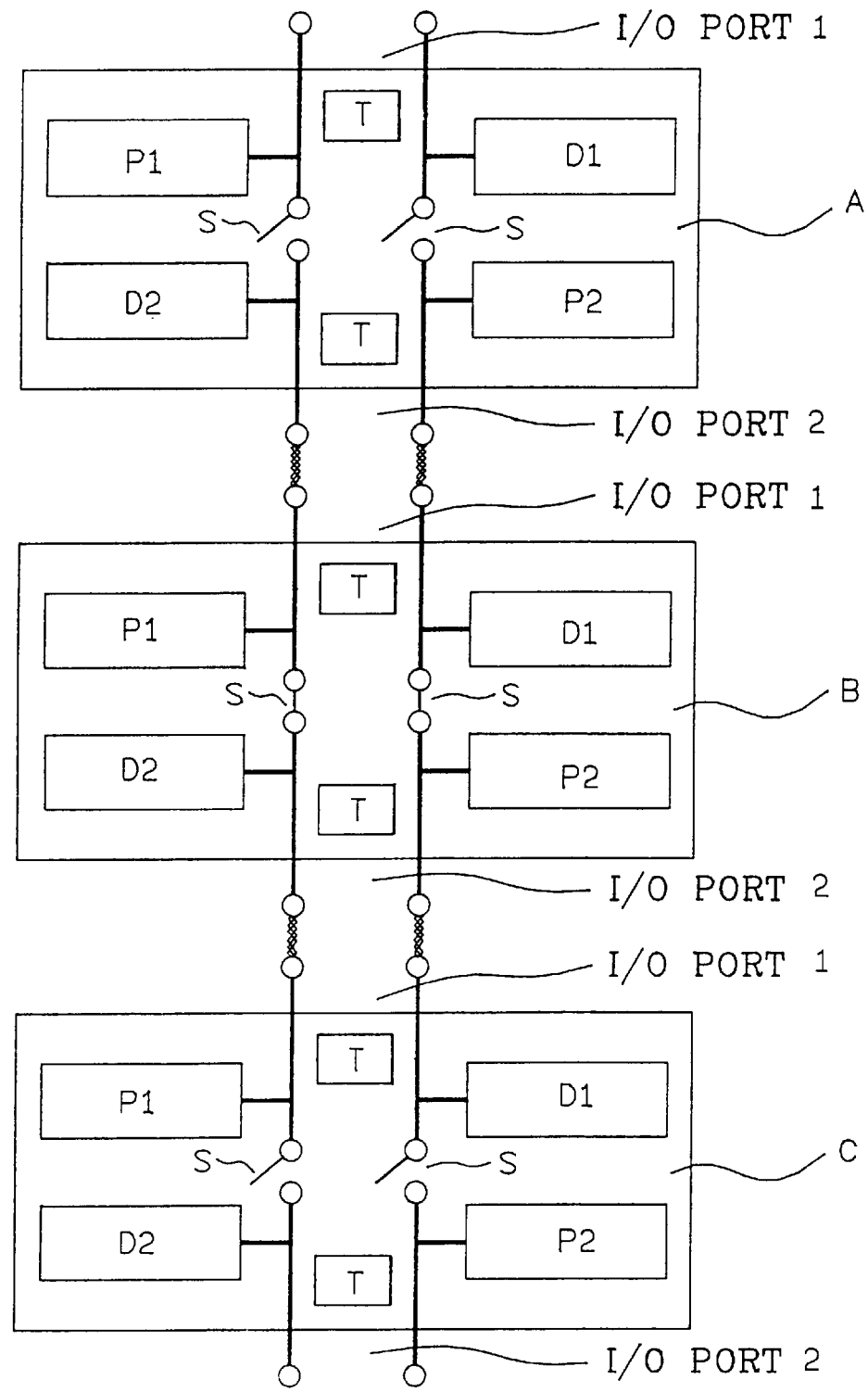
FIG. 3 is a schematic view showing a network system in FIG. 2 in a second state.

2. The concentrators A and C are in power-on state, while the concentrator B is in power-off state:

Referring to FIG. 3, when the concentrator B is not in power-on state, its two switches S are in their closed state, while the switches S of the concentrator A and concentrator C are in open state. As far as the I/O port 2 of the concentrator A is concerned, though the concentrator B is not in power-on state, because the switches of the concentrator B are in closed state, the first power source generator P1 of the concentrator C can still cause its electric signals to flow into the second power source detector D2 of the concentrator A, so one may ascertain that I/O port 2 of the concentrator A is not in a terminal state. As for the I/O port 1 of the concentrator C, the electric signal of the second power source generator P2 of the concentrator A can still pass through the concentrator B to the first power source detector D1 of the concentrator C. When the first power source detector D1 of concentrator C detect the electric signal, it is ascertained that the I/O port of the concentrator C is not a terminal state.

Figure 4:
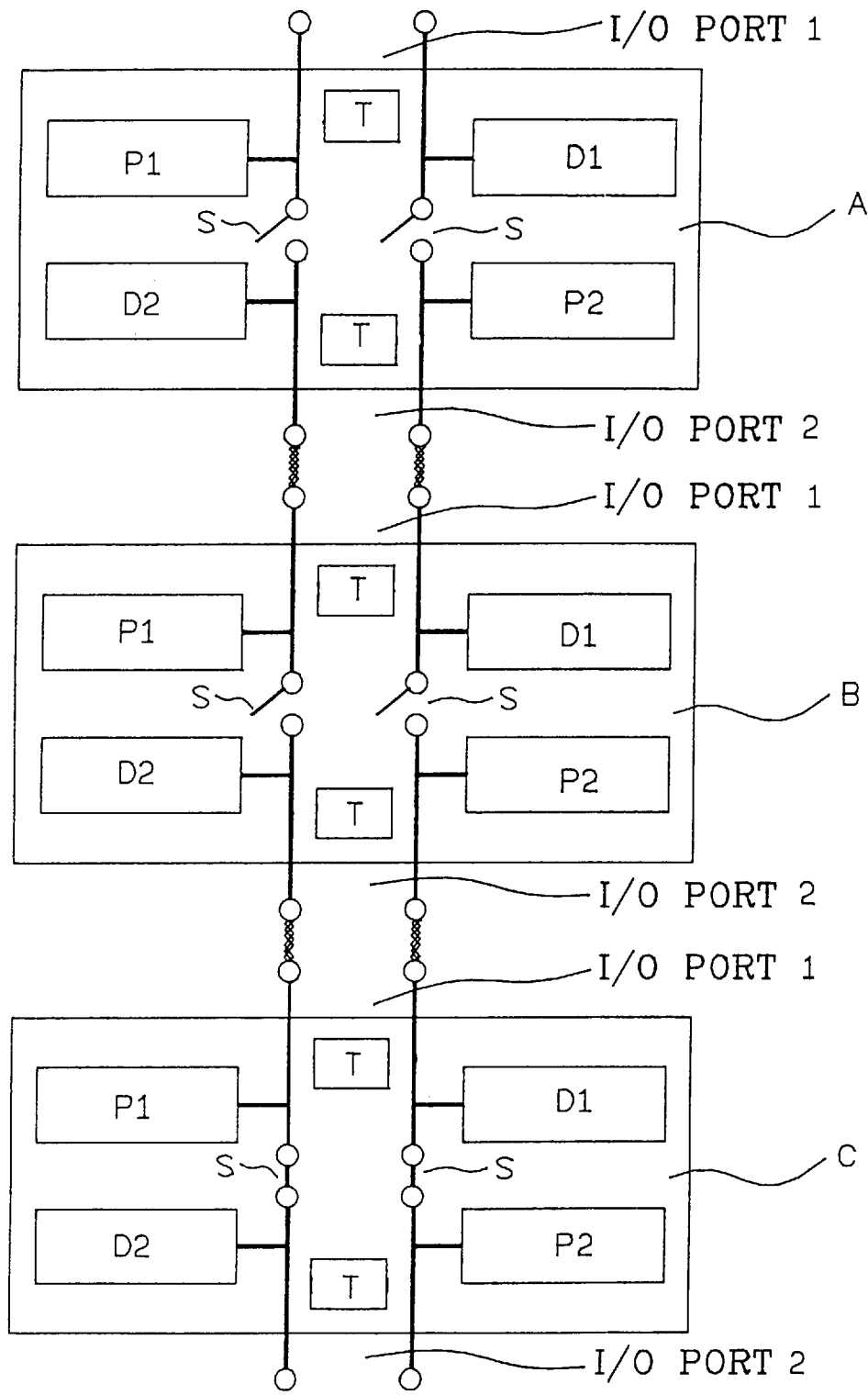
FIG. 4 is a schematic view showing a network system in FIG. 2 in a third state.

3. The concentrator A and B are in power-on state, while concentrator C is in power-off state:

Referring to FIG. 4, which shows the power for the concentrators A and B is on, the switches S of concentrators A and B are in open state, and the switches S of the concentrator C are in closed state. Consequently, as the concentrator B is taken into account, due to the power-off state of the concentrator C, the first power source generator P1 and the second power source generator P2 of the concentrator C will not transmit any electric signal, and in turn the second power source detector D2 of concentrator B will not detect any signal, either. Consequently, it is ascertained that the I/O port 2 of the concentrator B is in a terminal state.

Figure 10:
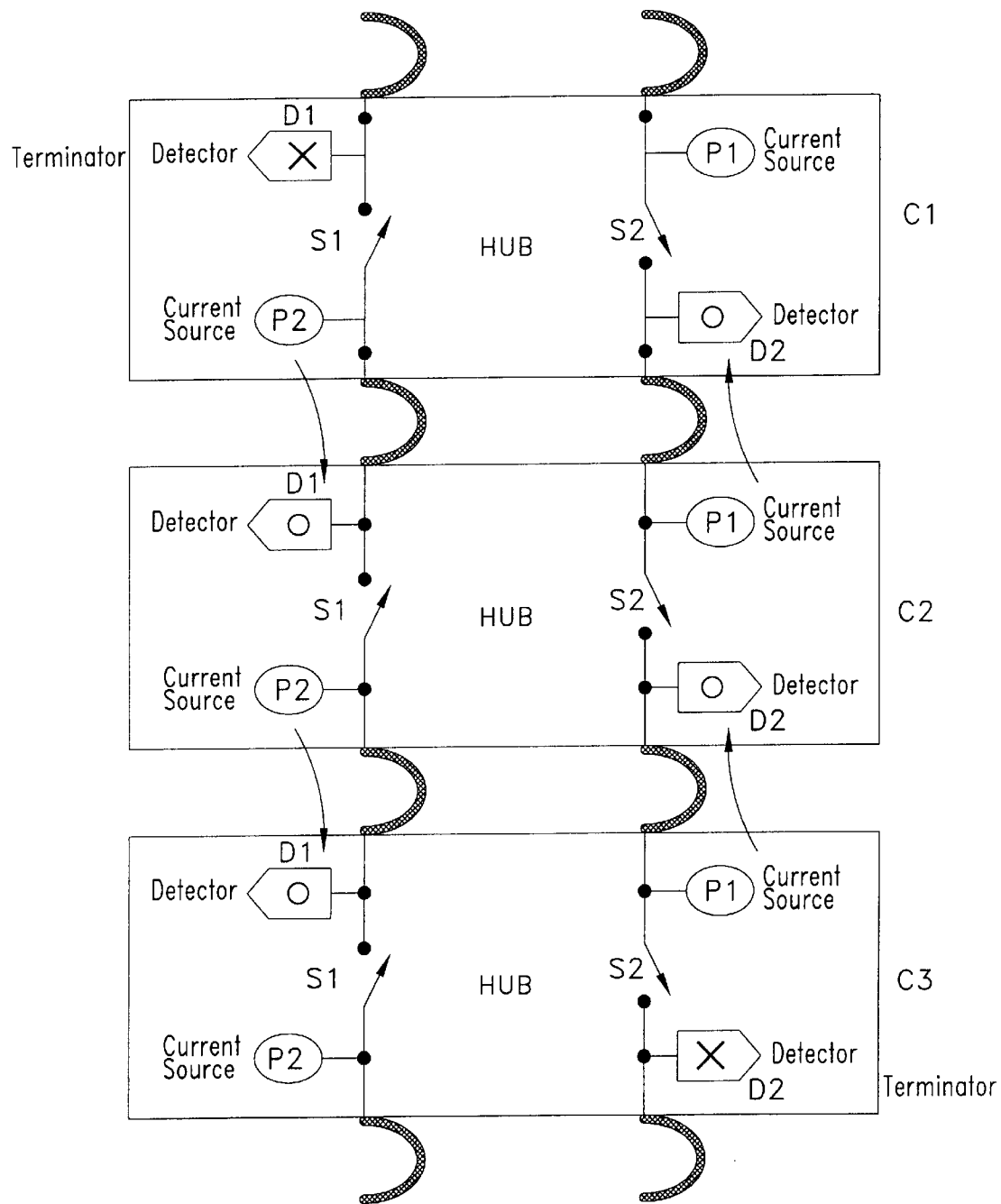
FIG. 10 is a schematic view showing a preferred embodiment of an auto-terminator scheme 1 of the present invention.

The auto-terminator-detection architecture and schemes shown in FIGS. 8 to 11 and employed in this invention is described as follows:

When the concentrator is in a power-on state, the control switches S1 and S2 are kept in an open state, whereas if the concentrator is in a power-off state, the control switches S1 and S2 remain in a closed state. Therefore, as illustrated in FIG. 10, wherein the auto-terminator scheme 1 depicts the situation of the concentrators C1, C2 and C3 which are all in power-on state and the control switches S1 and S2 of each concentrator in FIG. 10 are all in open state corresponding to this power-on state. Hence the supply current generated from the current source P2 of the concentrator C1 is capable of being transmitted to the detector D1 of the concentrator C2, which makes the concentrator C2 acknowledge the existence of the concentrator C1. Under the similar operation, the supply current generated from the current source P1 of the concentrator C2 is transmitted to the detector D2 of the concentrator C2, which makes the concentrator C1 acknowledge the existence of the concentrator C2. By the same way, the concentrator C2 is capable of acknowledging the existence of concentrator C3.

However, the detector D1 of the concentrator C1 detects nothing from its outside, and hence concentrator C1 is acknowledging that there has no any concentrator device next to it over the detector D1 together with the current source P1. Therefore, concentrator C1 acknowledges itself is in a terminal state. By the same way, the detector D2 of the concentrator C3 detects no current entering from outside, and hence the concentrator C3 acknowledges itself is also in a terminal state. Therefore, the terminators of the network can be set by the detectors D1 and D2 of the concentrators C1 and C3, respectively.

Figure 11:
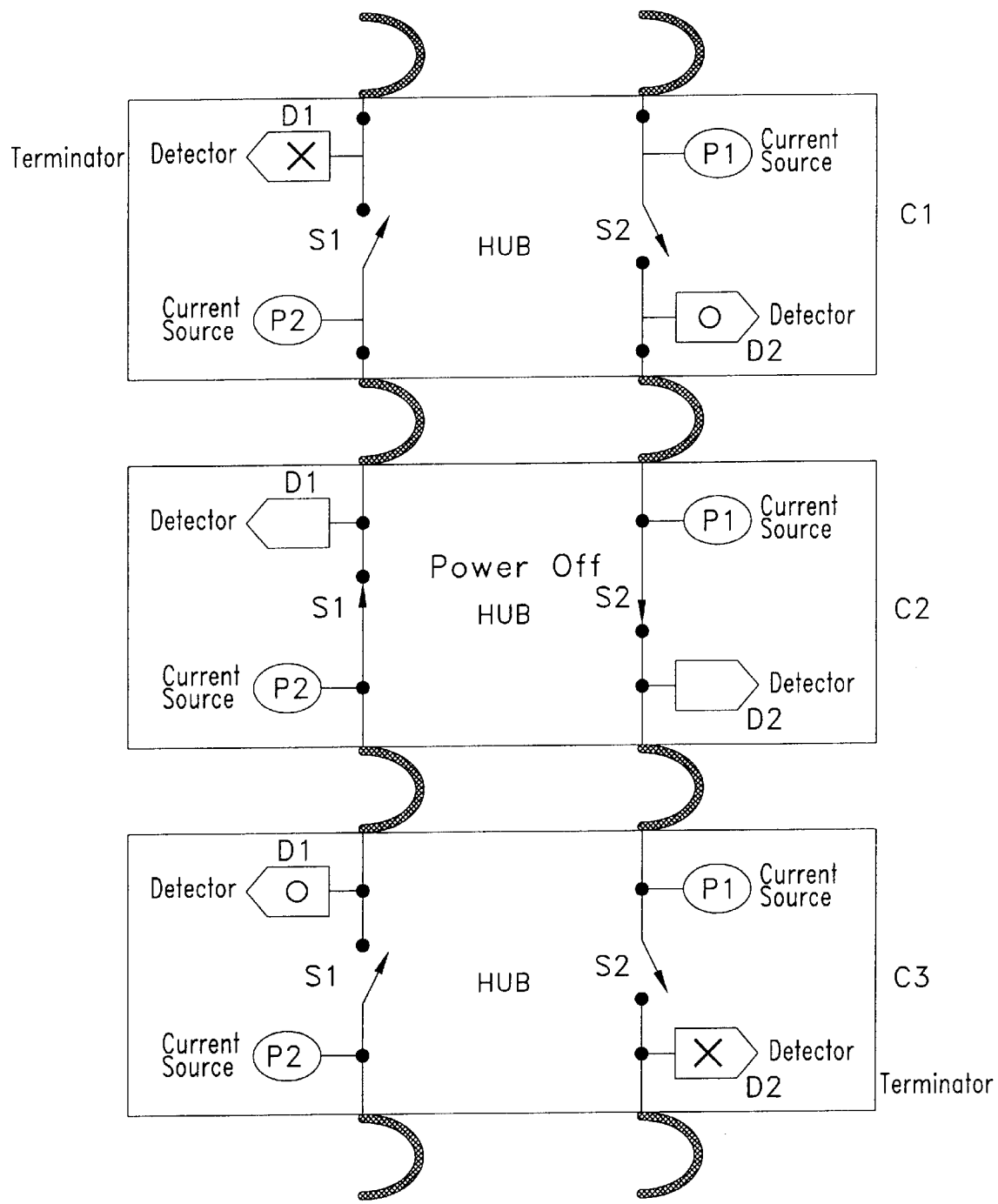
FIG. 11 is a schematic view showing a preferred embodiment of an auto-terminator scheme 2 of the present invention.

The other illustration for autosetting terminal states is the auto-terminator scheme 2 depicted in FIG. 11, wherein the concentrator C2 is in power-off state, and hence the detectors D1, D2 and the current sources P1, P2 are all in an inactive condition, and in accordance with the above situation the control switches S1 and S2 are both in closed state. Therefore, the detector D1 of the concentrator C3 is capable of detecting the current generated from the current source P2 of the concentrator C1, and similarly the detector D2 of the concentrator C1 is able to detect the current generated from the current source P1 of the concentrator C3. The FIG. 11 demonstrates the operation of the auto-terminator scheme employed in one of the stackable concentrators in power-off state.

Thus, if the method for setting the terminal state for concentrators and the related device are applied, whenever the entire system is started the terminal states for the two involved I/O ports of the concentrator being located and will be set, no matter how tremendous the network system is and whether all or some of these concentrators are in power-on or power-off state.

After completing the terminal state setting for the network system with stackable concentrators, the ID number assignment for concentrators is pursued.

Figure 7:
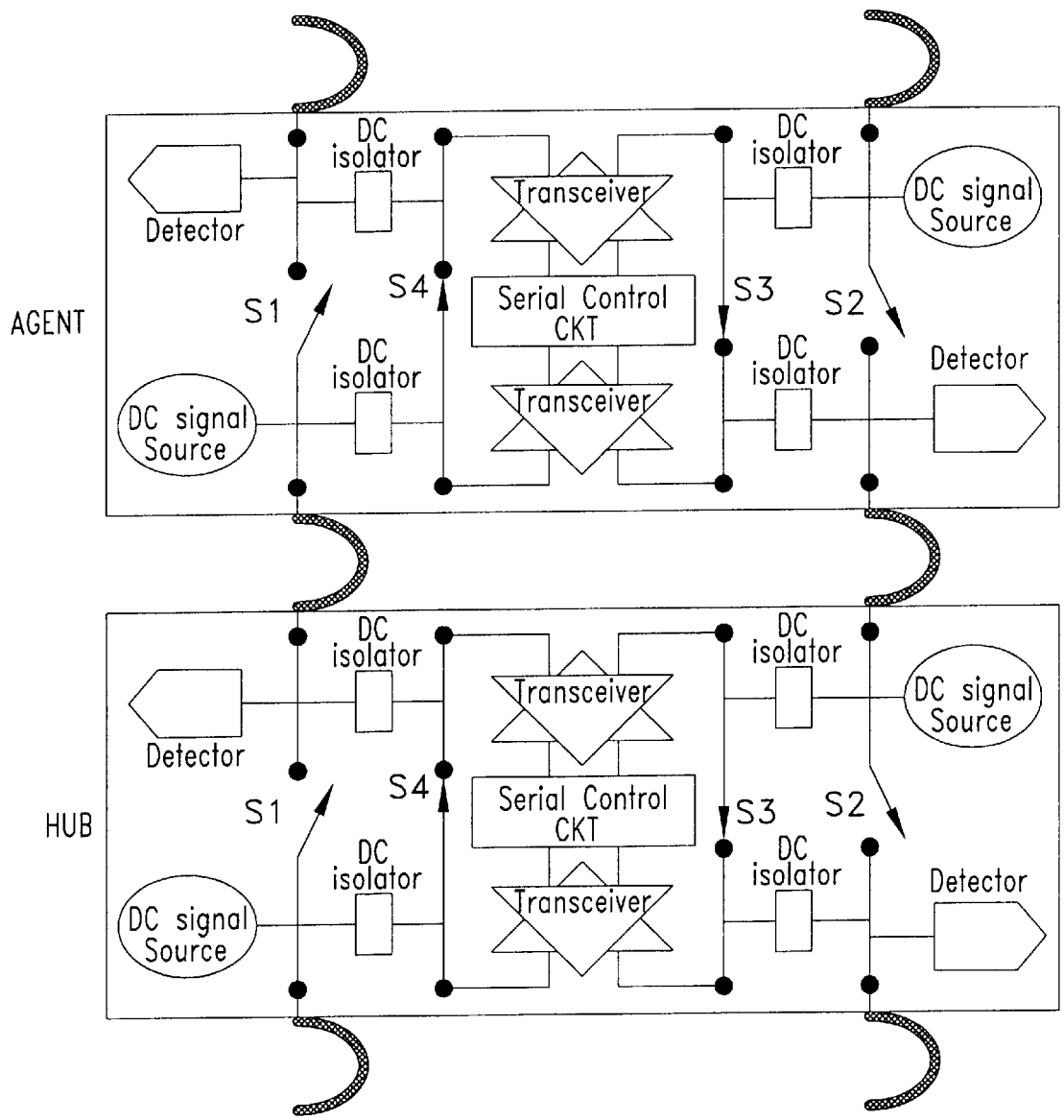
FIG. 7 is a schematic view showing a preferred embodiment of an auto-ID over auto-terminator architecture of the present invention.
Figure 8:
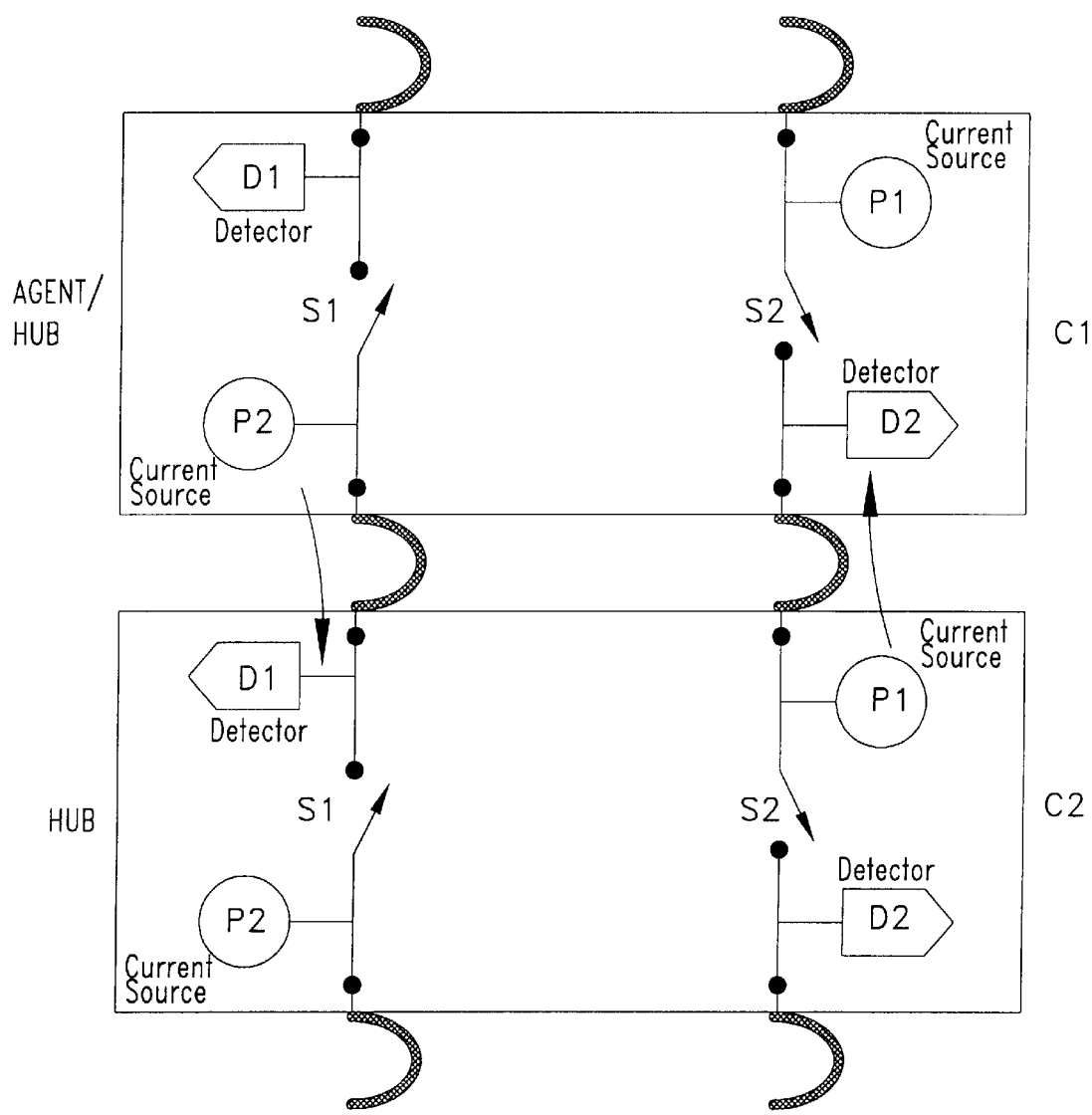
FIG. 8 is a schematic view showing a preferred embodiment of an auto-terminator architecture of the present invention.
Figure 9:
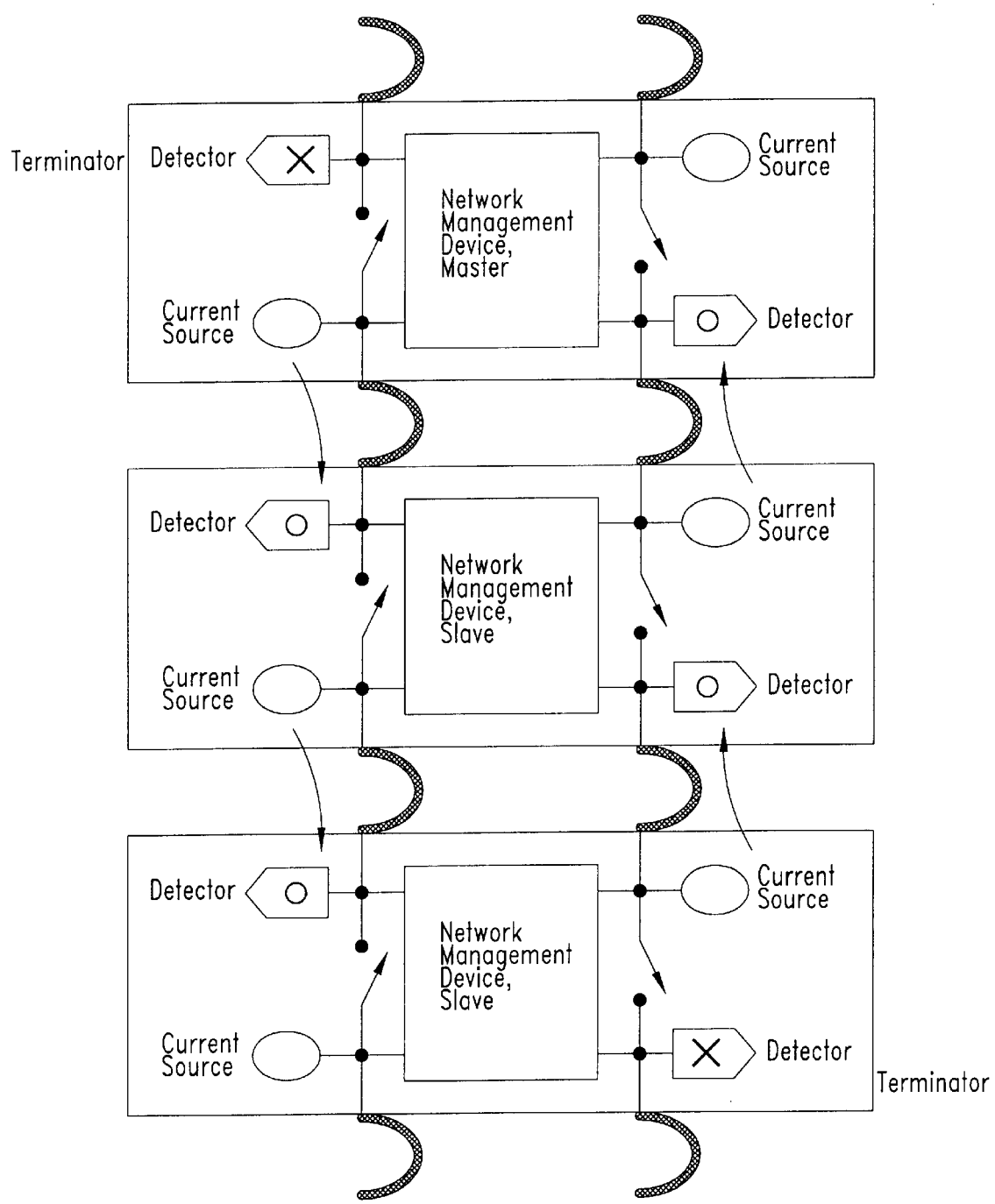
FIG. 9 is a schematic view showing a preferred embodiment of an auto-terminator scheme of the present invention.

The algorithms employed in the auto-ID over auto-terminator architecture as shown in FIG. 7, are described as follows:

(1) The auto-terminator is utilized to determine the end of an element in a stack, which is implemented by hardware to determine which concentrator is located at the end of the network.

(2) Point-to-point access protocol is employed to assign ID. Accordingly, only an auto-ID frame is accepted by a new entry element, a unique ID is assigned to a new entry element, and the old element keeps the previous ID. If a new entry has an old ID, then the conflicted ID element will be reassigned with a new ID.

Figure 12:
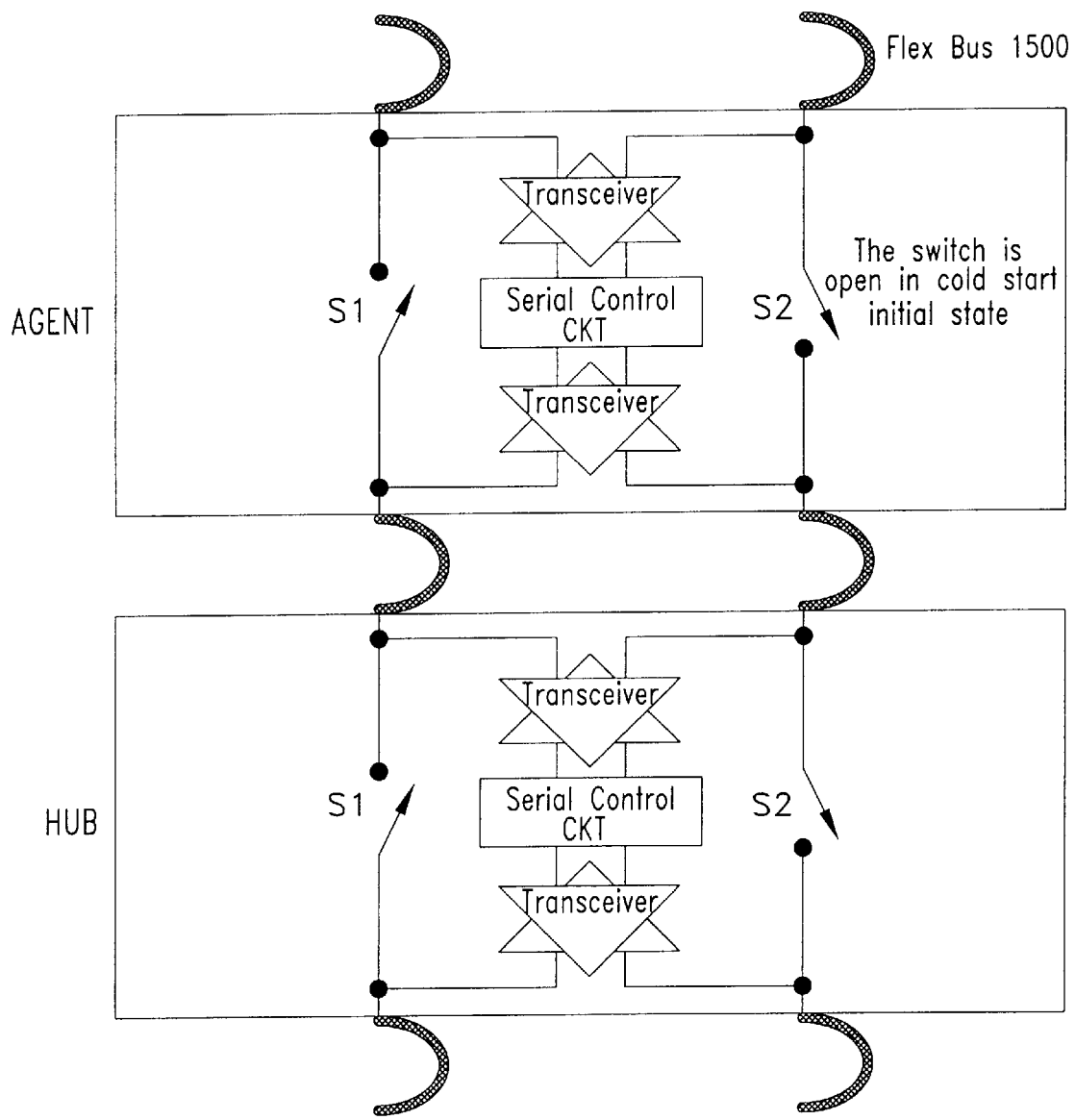
FIG. 12 is a schematic view showing a preferred embodiment of a management bus architecture for auto-ID assignment of the present invention.
Figure 18:
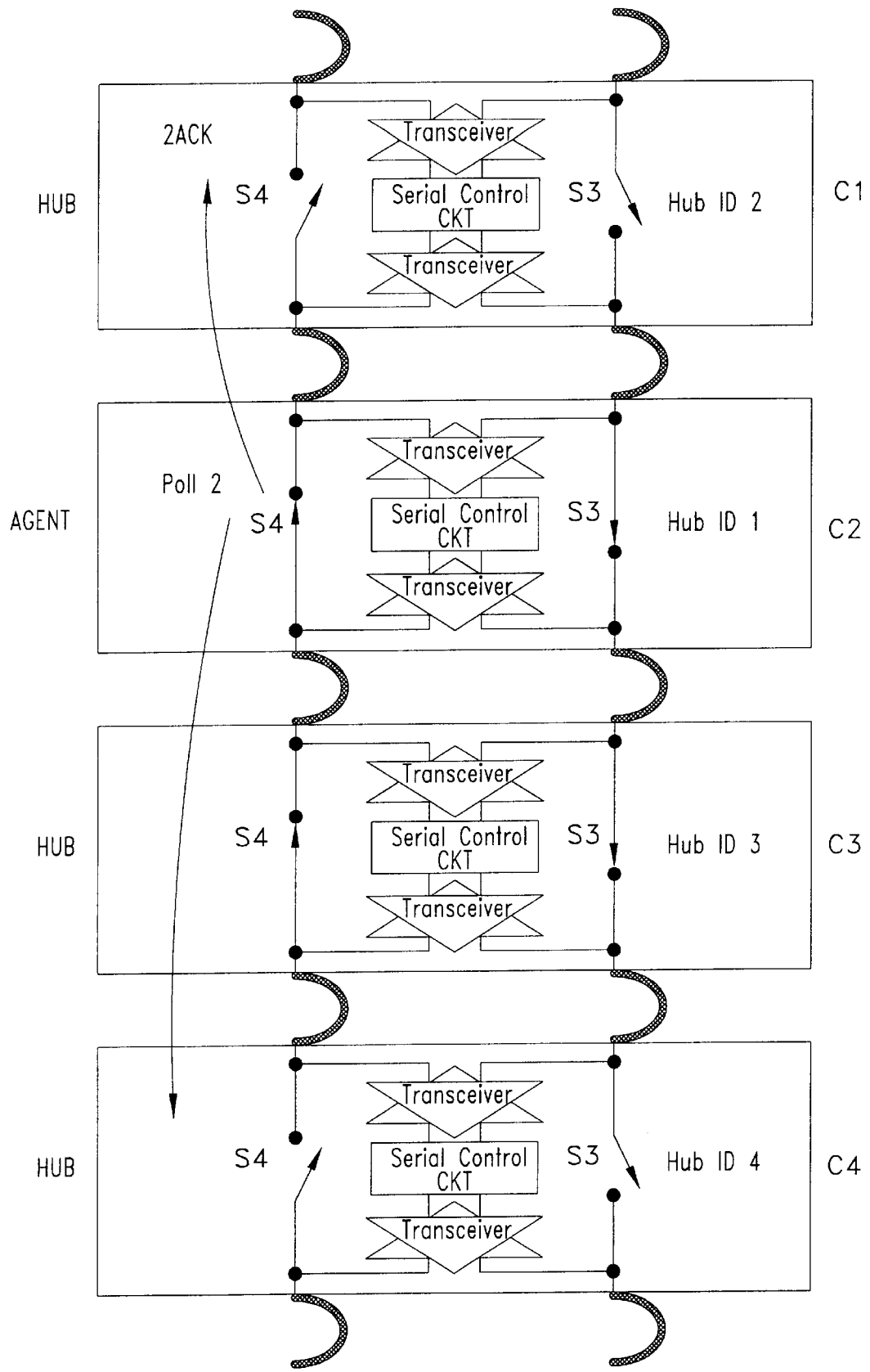
FIG. 18 is a schematic view showing a preferred embodiment of a bus access structure of the management bus architecture of the present invention.

(3) Two common bus access architectures are used in normal operation. (i) A poll/ack protocol is implemented over the bus architecture; (ii) A half duplex protocol is employed to avoid bus contention, as shown in FIGS. 12 & 18.

Figure 19:
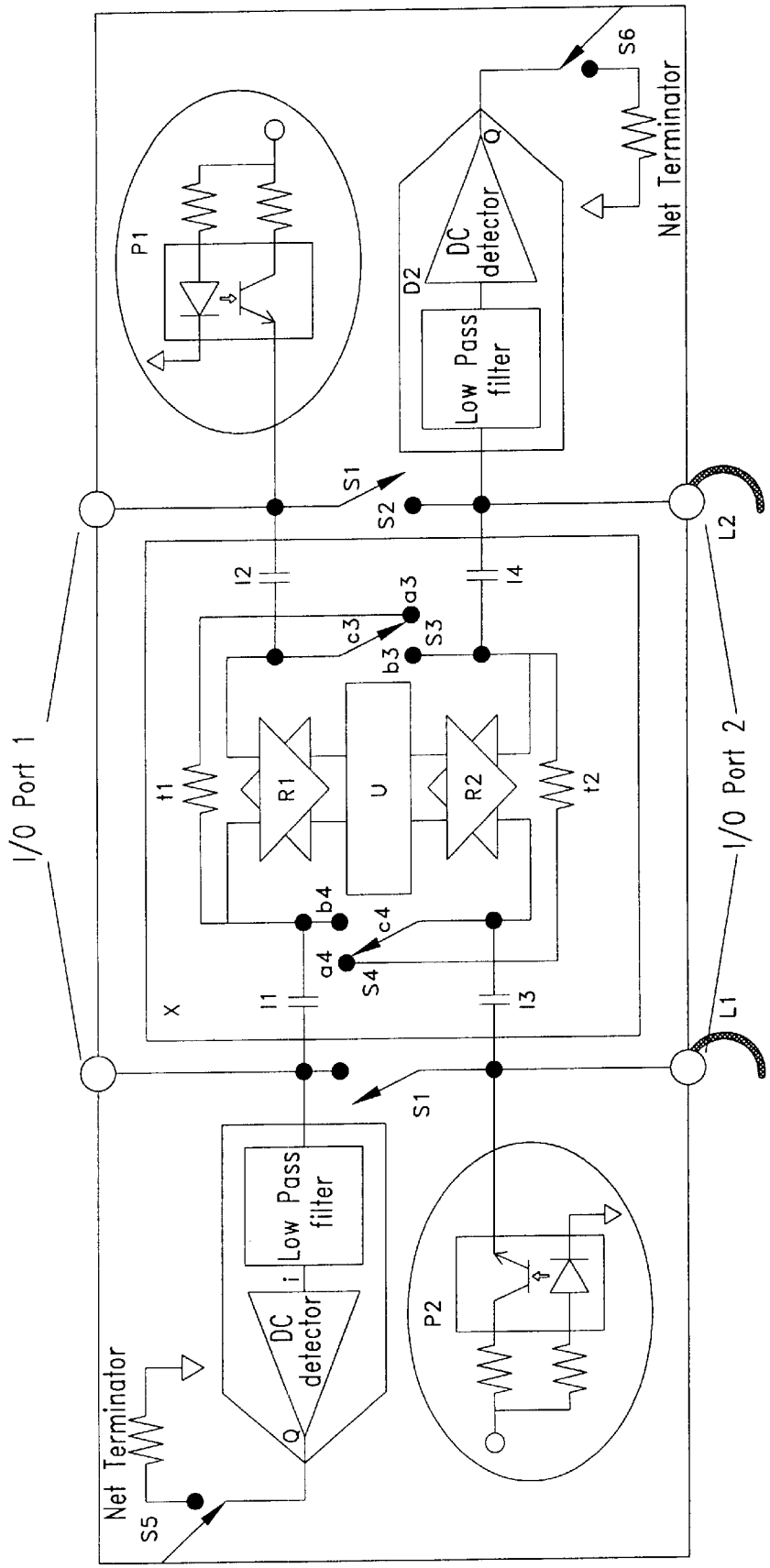
FIG. 19 shows the first short-circuiting situation of the control switches S3 and S4 for auto-ID assignment used as a preferred embodiment for the present invention.
Figure 20:
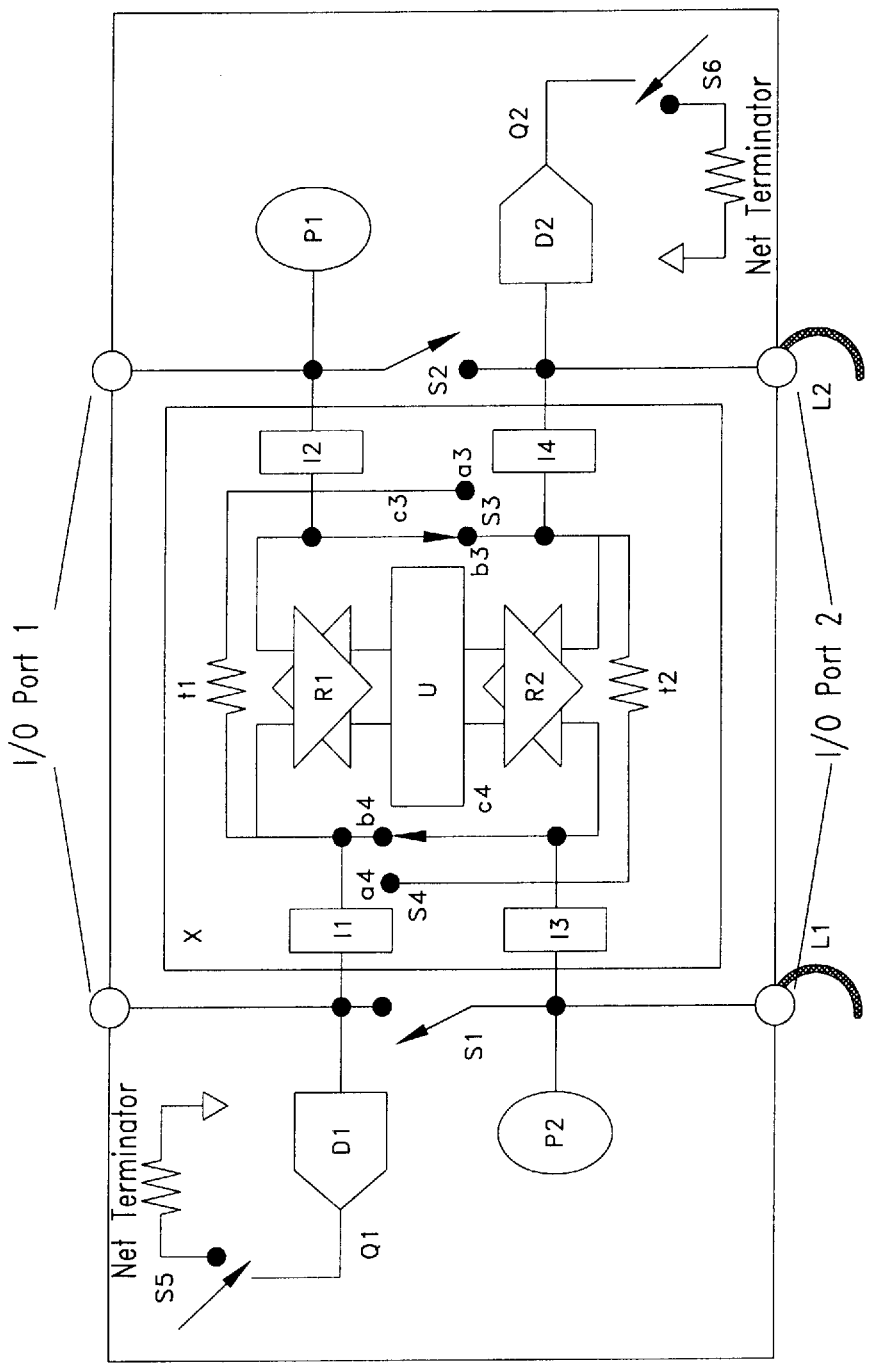
FIG. 20 shows the second short-circuiting situation of the control switches S3 and S4 for auto-ID assignment used as a preferred embodiment for the present invention.
Figure 21:
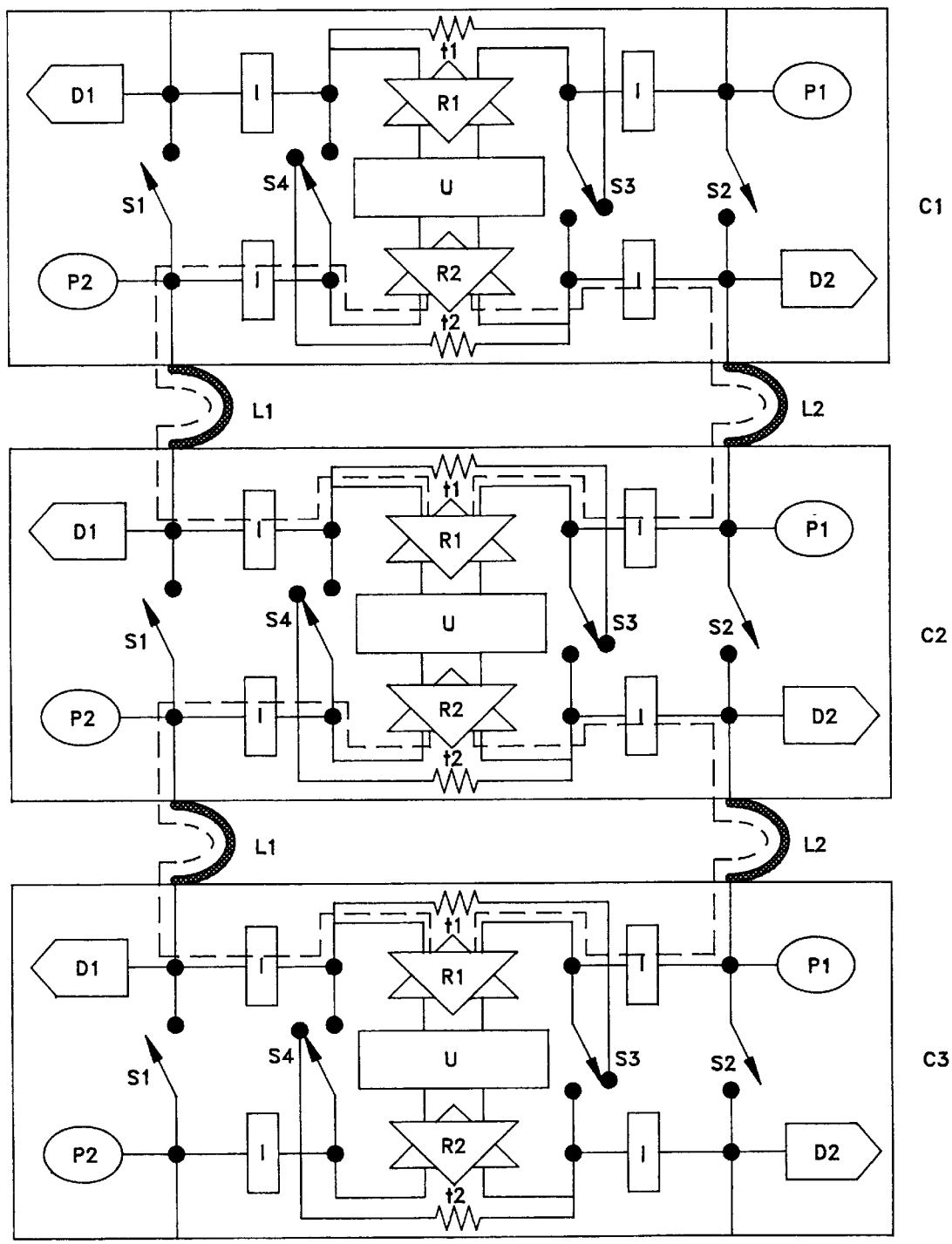
FIG. 21 shows the first mutual connection relations among the stackable concentrators for auto-ID assignment, corresponding to FIG. 19.
Figure 22:
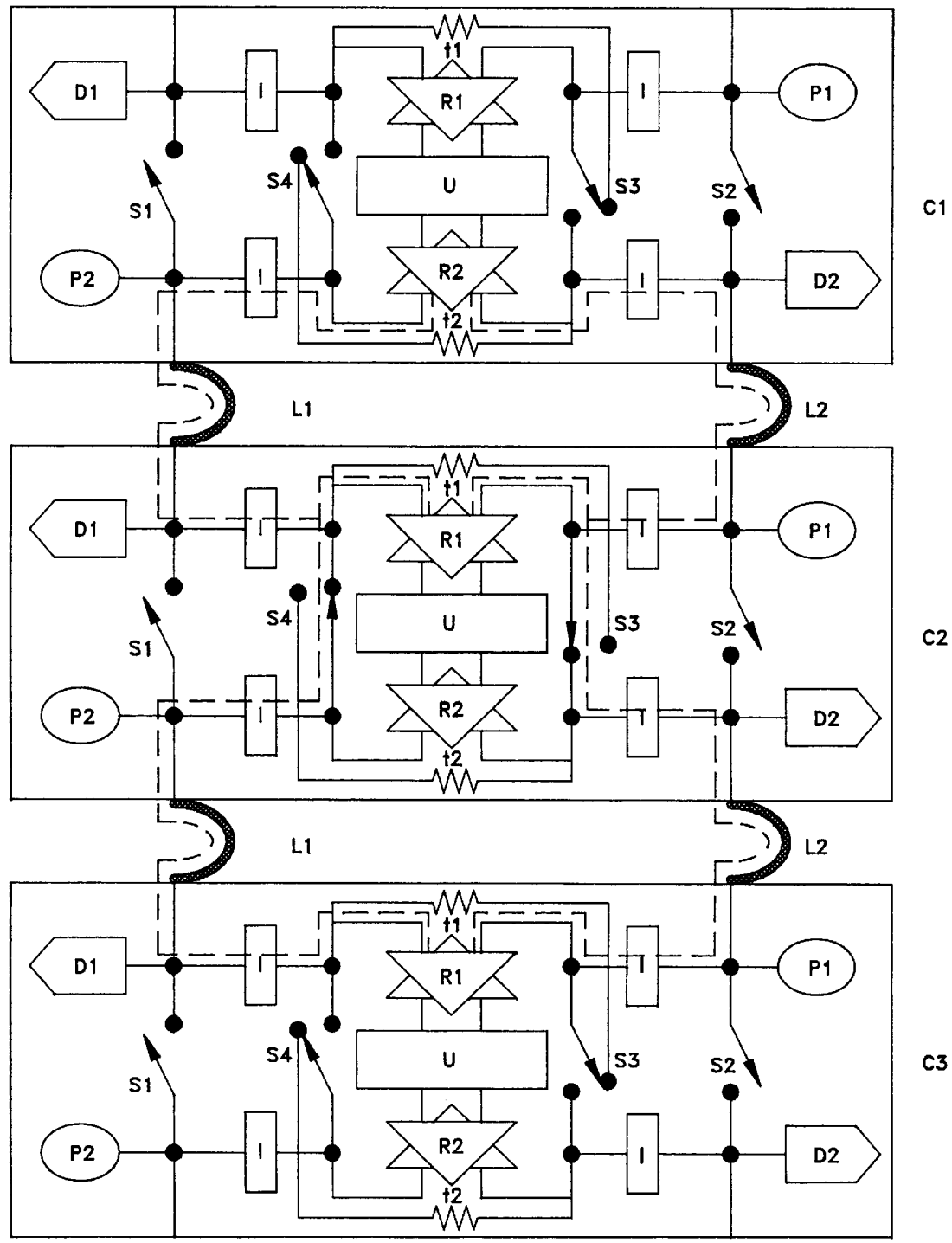
FIG. 22 shows the second mutually connecting relations among the stackable concentrators for auto-ID assignment, corresponding to FIG. 20.
Figure 23:
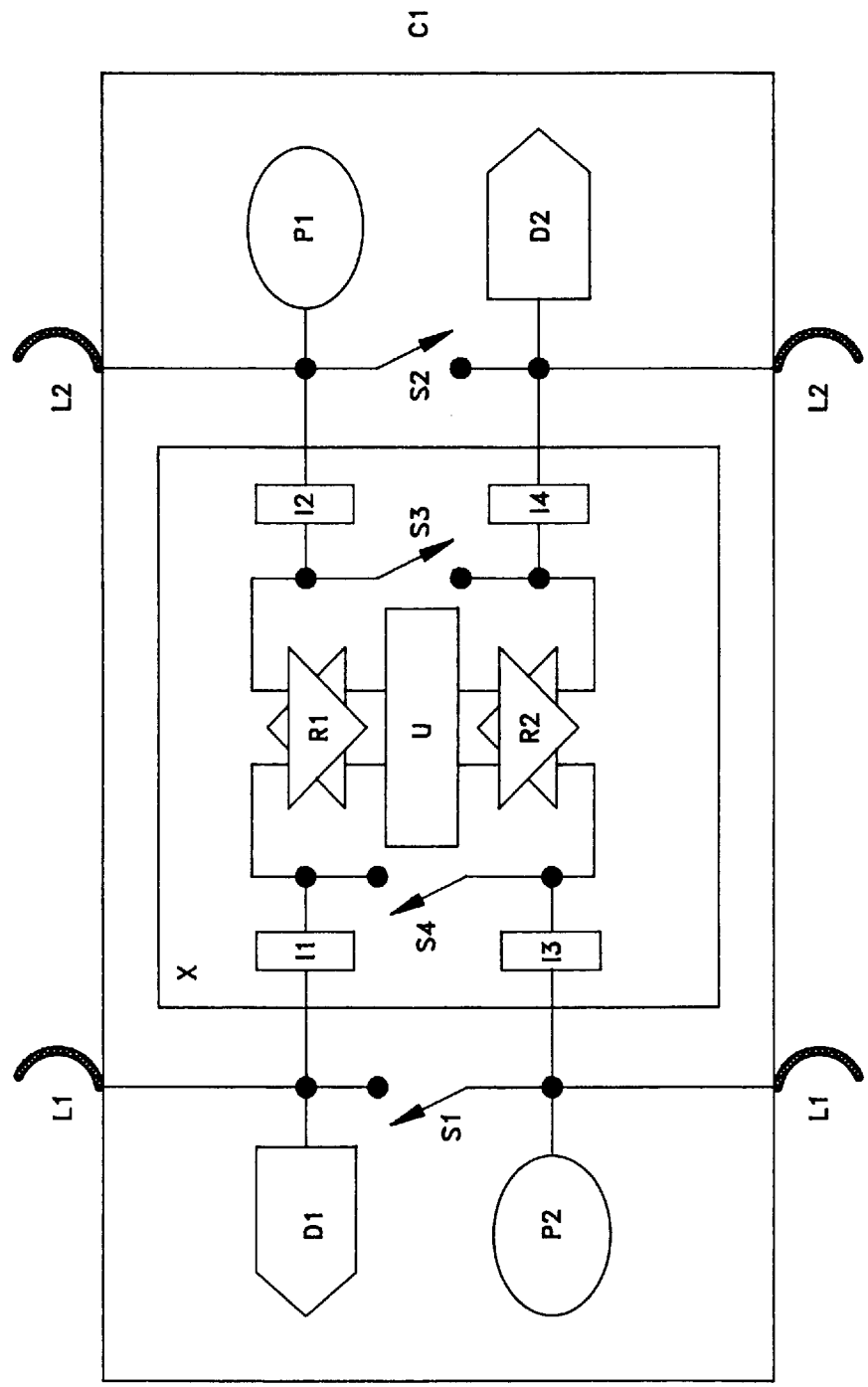
FIG. 23 is a schematic view showing a preferred embodiment of the interior hardware architecture of the concentrator employed in the present invention.

In addition, the method employed for auto-ID assignment further includes steps of:

a) causing the two I/O ports of each of the plurality of stackable concentrators including a master one in a mutually open state, which is implemented by short-circuiting the nodes a3, c3 of the switch S3 and nodes a4, c4 of the switch S4, respectively, as shown in FIG. 19. In addition, the mutually connection relations among the stackable concentrators are depicted in FIG. 21, wherein the transceiver R2 of the concentrator C1 is communicable only with the transceiver R1 of the concentrator C3, and similarly the transceiver R2 of the concentrator C2 is communicable only with the transceiver R1 of the concentrator C2, which are shown at the portion of FIG. 21 by the dash lines, respectively.

b) sequentially assigning distinctive ID numbers respectively for the concentrators from the master one to adjacent ones, and simultaneously causing the two I/O ports of one of the concentrators which has been assigned with one of the ID numbers in a mutually connecting state, which is implemented by short-circuiting the nodes b3, c3 of the switch S3 and nodes b4, c4 of the switch S4, respectively, as shown in FIG. 20. In addition, the mutually connection situation among the stackable concentrators are depicted in FIG. 22, wherein the transceiver R2 of the concentrator C1 is capable of communicating with the transceivers R1, R2 of the concentrator C2 and the transceiver R1 of the concentrators C3 at the same time, which is shown at the portion in FIG. 22 by the dash lines. It means that each concentrator is able to receive all signals in step b) of the auto-ID assignment scheme whenever the stackable concentrators are under this state, and c) reiteratively executing step b) until all of the plurality of concentrators have been assigned with ID numbers respectively.

Therefore, in the present invention, a device including a network for assigning the concentrator's ID number is employed, wherein a network management algorithm classifies the concentrators into a master concentrator and a slave concentrator.

The architectures of the master concentrator and the slave concentrator are identical. However, they function in a different operation modes, in which the master concentrator actively outputs a signal to the slave concentrator, while the slave concentrator passively makes an acknowledged response responsive to the received signal which is generated from the master concentrator.

The detailed description of the architectures and operations of the concentrators of a preferred embodiment according to the present invention is described as follows:

Please referring to FIG. 19 wherein the block X is a major apparatus used for auto-ID assignment of the concentrators. The architecture of the block X of a concentrator comprises four DC isolators (capacitors) I1, I2, I3 and I4, two signal transceivers R1 and R2, switches S3 and S4, and the transceiver terminator resistors t1 and t2 as well as a signal control device U.

The auto-ID assignment operation of the stackable concentrators used in the network system are depicted in FIGS. 21 & 22.

As depicted in FIG. 19, switches S3 and S4 are used as the control switches for executing steps a), b) and c) of the auto-ID assignment, and the transceiver terminator resistors t1 and t2 are utilized as the terminators of the transceivers R1 or R2 to execute step a), as shown in FIG. 21. As if the concentrators are in terminal states, such as the concentrators C1 and C3 in this invention, then the transceiver terminator resistors t1 and t2 are enabled to execute step c), as shown in FIG. 22. In addition, the device U in the concentrator is a signal control device, which is utilized to control the output and/or input of the signal and assure that the controlled signal remains in an alternating current form during the transmission process.

Figure 5:
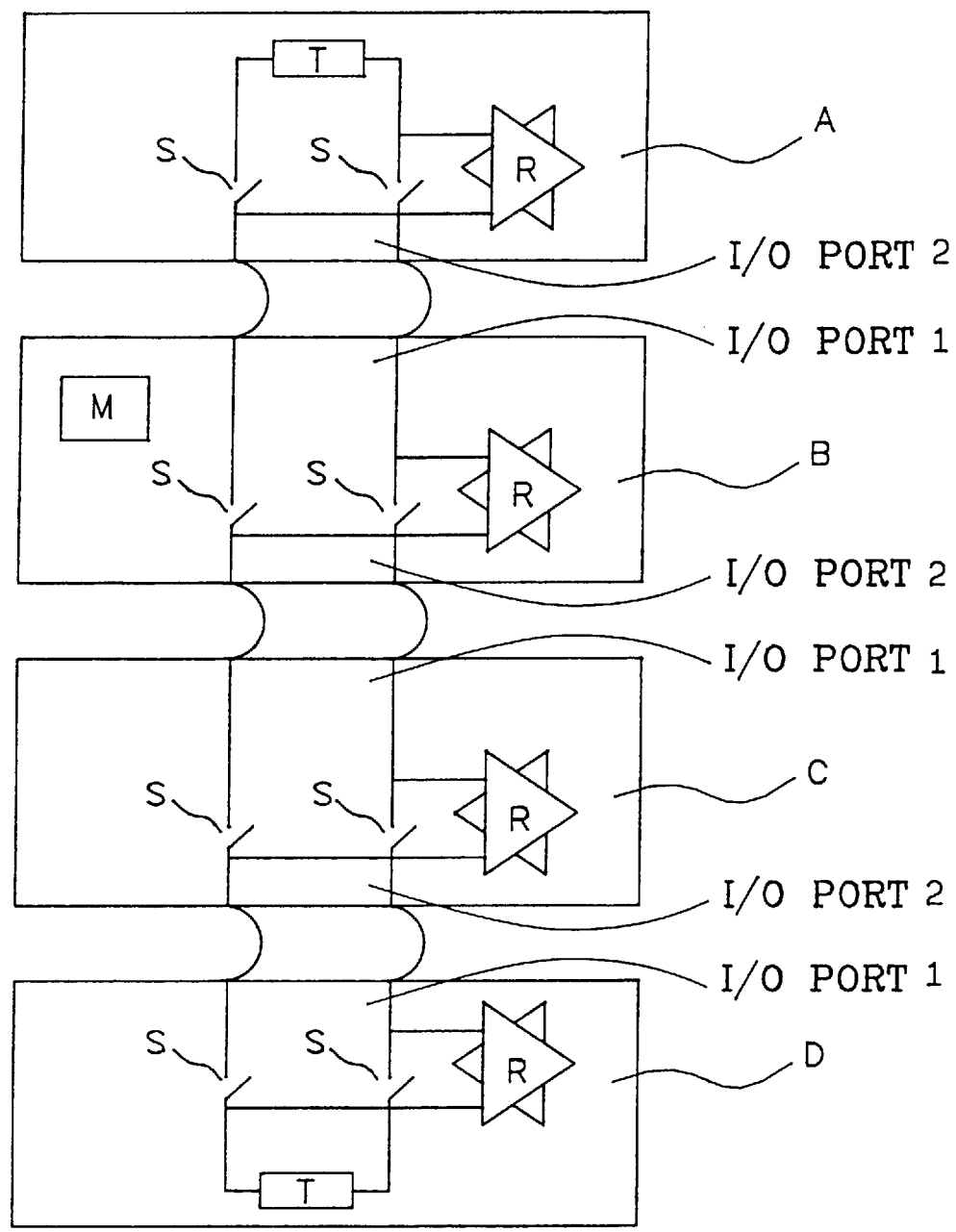
FIG. 5 is a schematic view showing a preferred embodiment of a network system for assigning ID number for the stackable concentrators therein.

Referring to FIG. 5, which is a schematic view showing a preferred embodiment of a network system assigning ID numbers for concentrators. Concentrators A, B, C and D each of which includes transceivers R and switches S which will be applied to perform the ID number assignment. Among concentrators A, B, C and D, the concentrator B having a memory unit M serves as a network agent. The present method for assigning ID number for the concentrator includes steps of:

Step 1: In the concentrators A, B and C that are in a power-on state, turn their switches to an open state, so that the I/O ports of each concentrators A, B and C are in open state.

Step 2: The network agent B assigns an ID number to one of its two adjacent concentrators A and C. Supposing the concentrator A is to be assigned first, then the agent B sends out a distinguishing order to the concentrator A. On receiving this order, the transceiver R of the concentrator A responds to the agent B with a signal. After receiving the signal from concentrator A, the concentrator B assigns an ID number to the concentrator A.

Step 3: After receiving the newly assigned ID number from the concentrator B, the transceiver of concentrator A will ascertain whether an initial ID number has been assigned. If the concentrator A has an ID number already, there will have two different ways of assigning the ID number for concentrator A: firstly, the concentrator A compares its original ID number to those ID numbers stored in the memory unit of the agent B which have been assigned. If the original ID number of concentrator A is identical to one of the ID numbers mentioned above, then the agent B will assign a brand-new ID number to the concentrator A, and the concentrator A discard its original one. On the contrary, when none of the ID numbers in the memory of the agent B which have been assigned is identical to the original ID number of the concentrator A, the concentrator A maintains its original ID number. Secondly, the concentrator B forces concentrator A to accept the new ID number assigned by the agent B and discard its original one.

Step 4: After the ID number of the concentrator A is determined, the agent B will record the assigned ID number to its memory unit M in order to prevent the ID numbers to be assigned afterwards from being identical to this ID number.

Step 5: The network agent B queries the concentrator A whether it has an I/O port in a terminal state. If yes, the agent B assigns ID numbers to those neighboring concentrators on the side of the agent B where the concentrator A is positioned, and resumes the ID number assignment for other concentrators on the opposite side of the agent B where the concentrator C is located.

Step 6: Since the concentrator A is in terminal state, so the agent B repeats Steps 2, 3, 4 and 5 to assign ID number for the concentrator C. While in Step 5, because the concentrator C is not in terminal state, after finishing the ID number assignment for the concentrator C, the agent B will force the concentrator C to let the switches S stay in a closed state. On this account, signals transmitted from the agent B can reach the transceiver R of concentrator D, and in turn the ID number of the concentrator D can be assigned. After concentrators in two ends, i.e. A and D, have their terminal states been determined, the ID number assignment for the concentrators in the entire system is completed.

Figure 13:
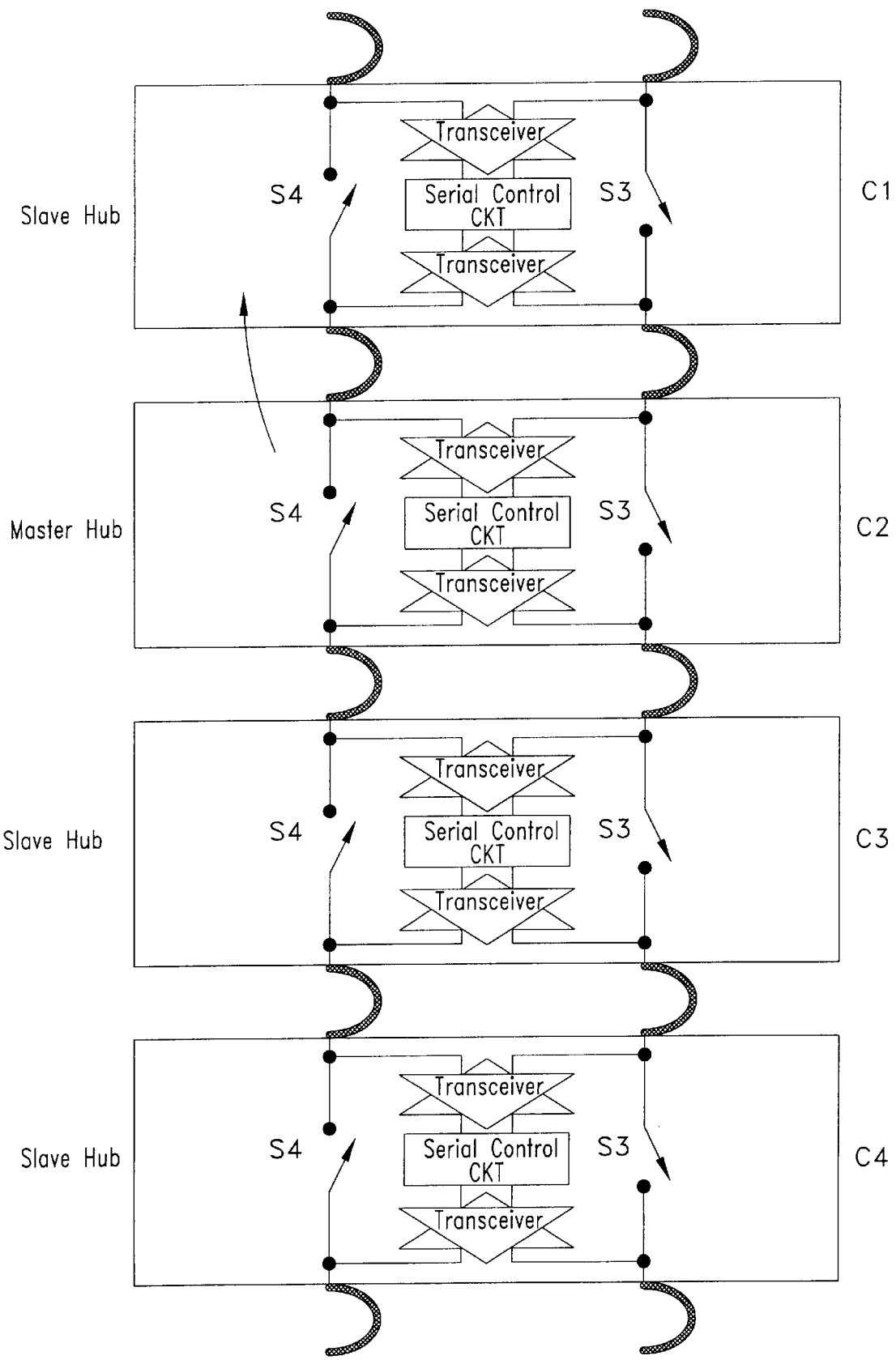
FIG. 13 shows the auto-ID assignment step 1of the management bus architecture depicted in FIG. 12.

The detailed explanations for steps 1~6 of auto-ID assignment are described as follows:

Step 1: Please refer to FIG. 13. In the initial state, control switches S3 and S4 of the concentrators are all in an open state, and the concentrator C2 is a pre-appointed master concentrator of the stackable concentrators C1~C4.

Figure 14:
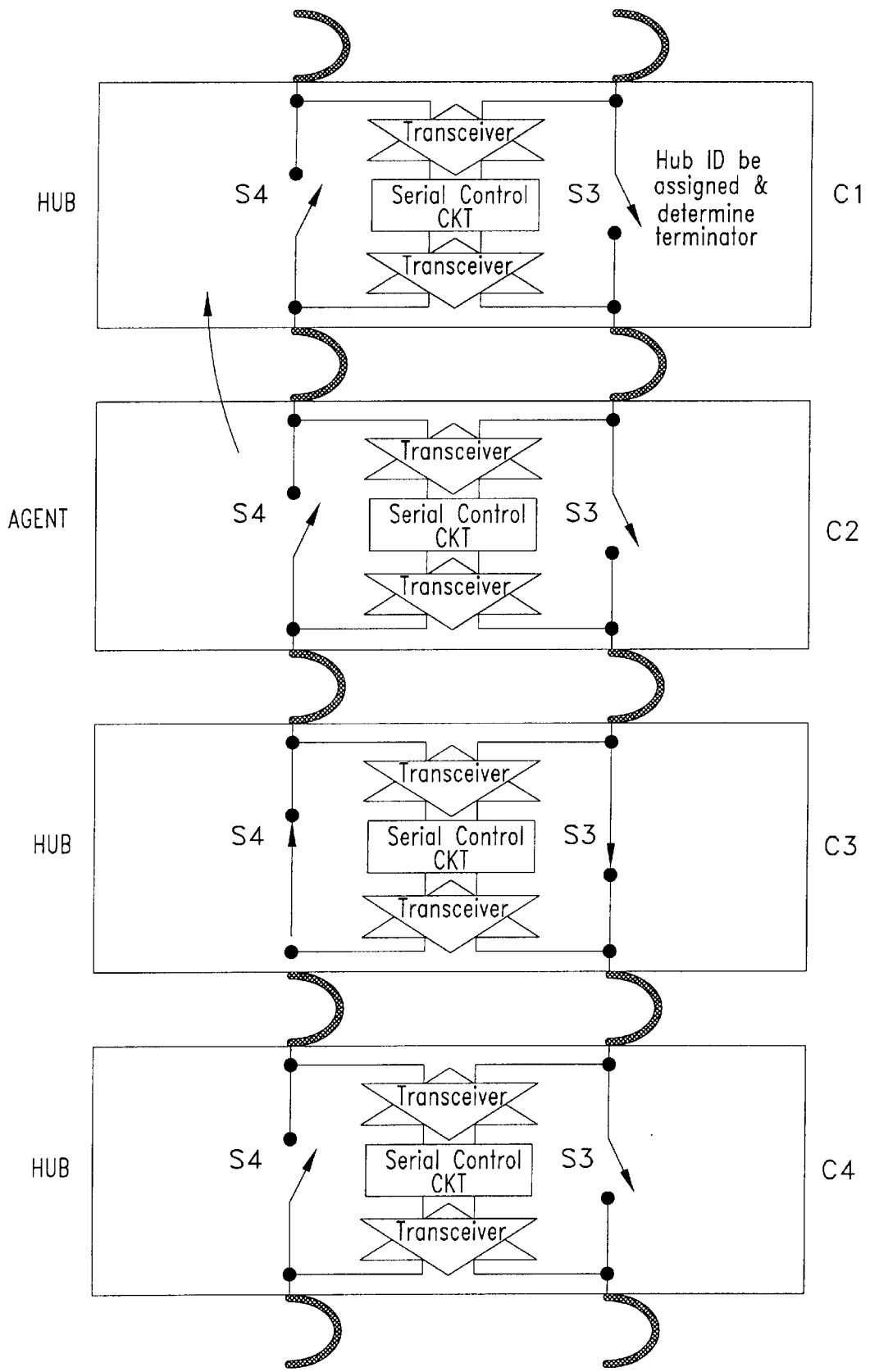
FIG. 14 shows the auto-ID assignment step 2of the management bus architecture depicted in FIG. 12.

Step 2: Please refer to FIG. 14, wherein the master concentrator C2 inquires and assigns an ID number to the polling concentrator C1, and after receiving the ID number assigned by the concentrator C2, the concentrator C1 responds to and informs of the concentrator C2 that it has to cease the inquiring and ID assignment process executed along the upward side in FIG. 14, owing to the serial control circuit CKT of the auto-terminator in the concentrator C1 acknowledging that C1 itself is set in a terminal state.

Figure 15:
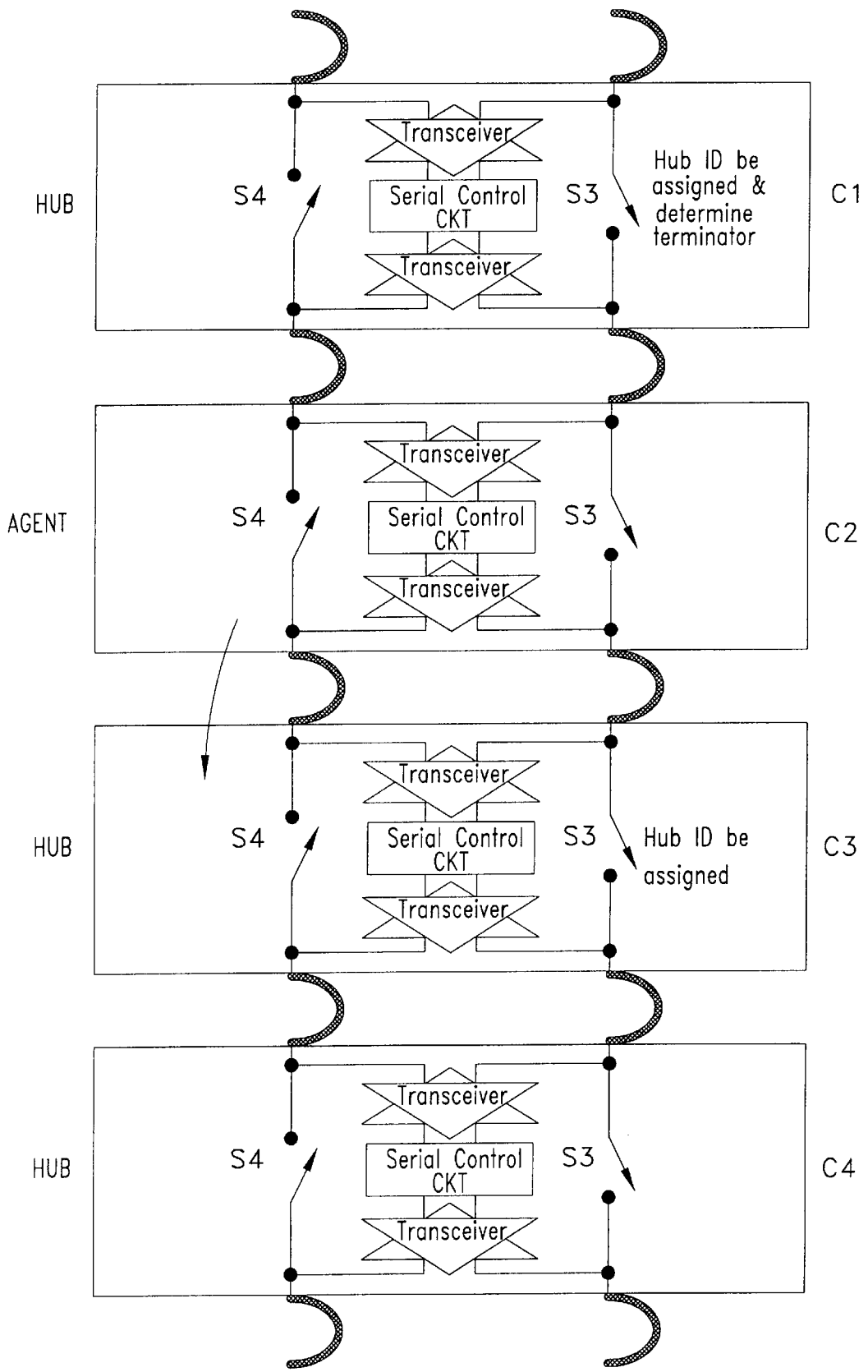
FIG. 15 shows the auto-ID assignment step 3of the management bus architecture depicted in FIG. 12.

Step 3: Therefore, the master concentrator C2 acknowledged that it is unnecessary to inquire over the concentrator C1. Therefore, please refer to FIG. 15, the master concentrator C2 is going to inquire and assign an ID number to the polling concentrator C3. After receiving the ID number assigned by the concentrator C2, the concentrator C3 closes the control switches S3 and S4, and responds to and informs of the concentrator C2 that it has to keep inquiring and ID number assigning for the polling concentrator C4.

Figure 16:
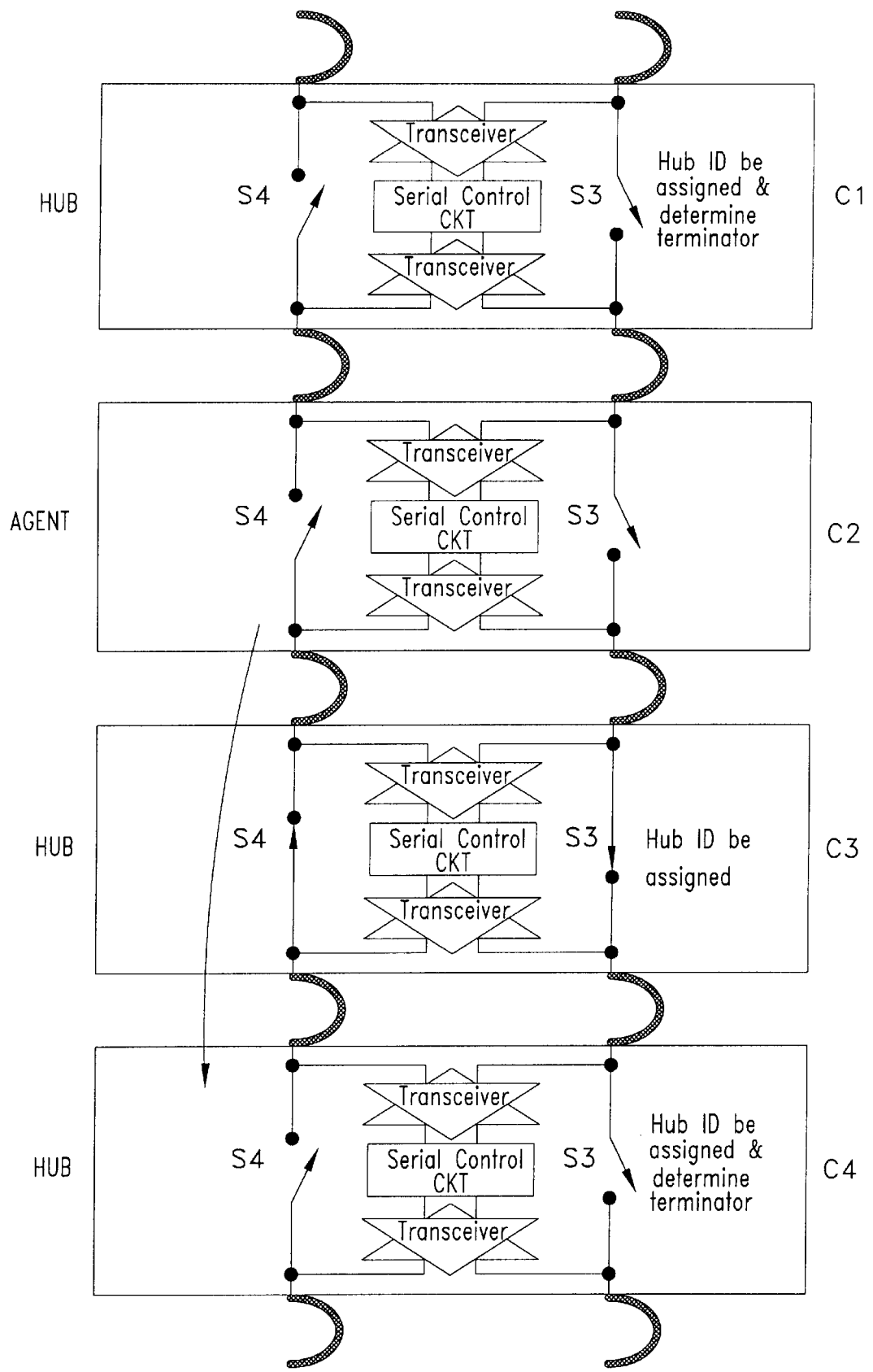
FIG. 16 shows the auto-ID assignment step 4of the management bus architecture depicted in FIG. 12.

Step 4: Please refer to FIG. 16, after receiving the ID number assigned by the concentrator C2, the concentrator C4 responds to and informs of the concentrator C2, which causes the master concentrator C2 to stop the inquiring and ID assignment process due to the same reason recited for the concentrator C1 in Step 2.

Figure 17:
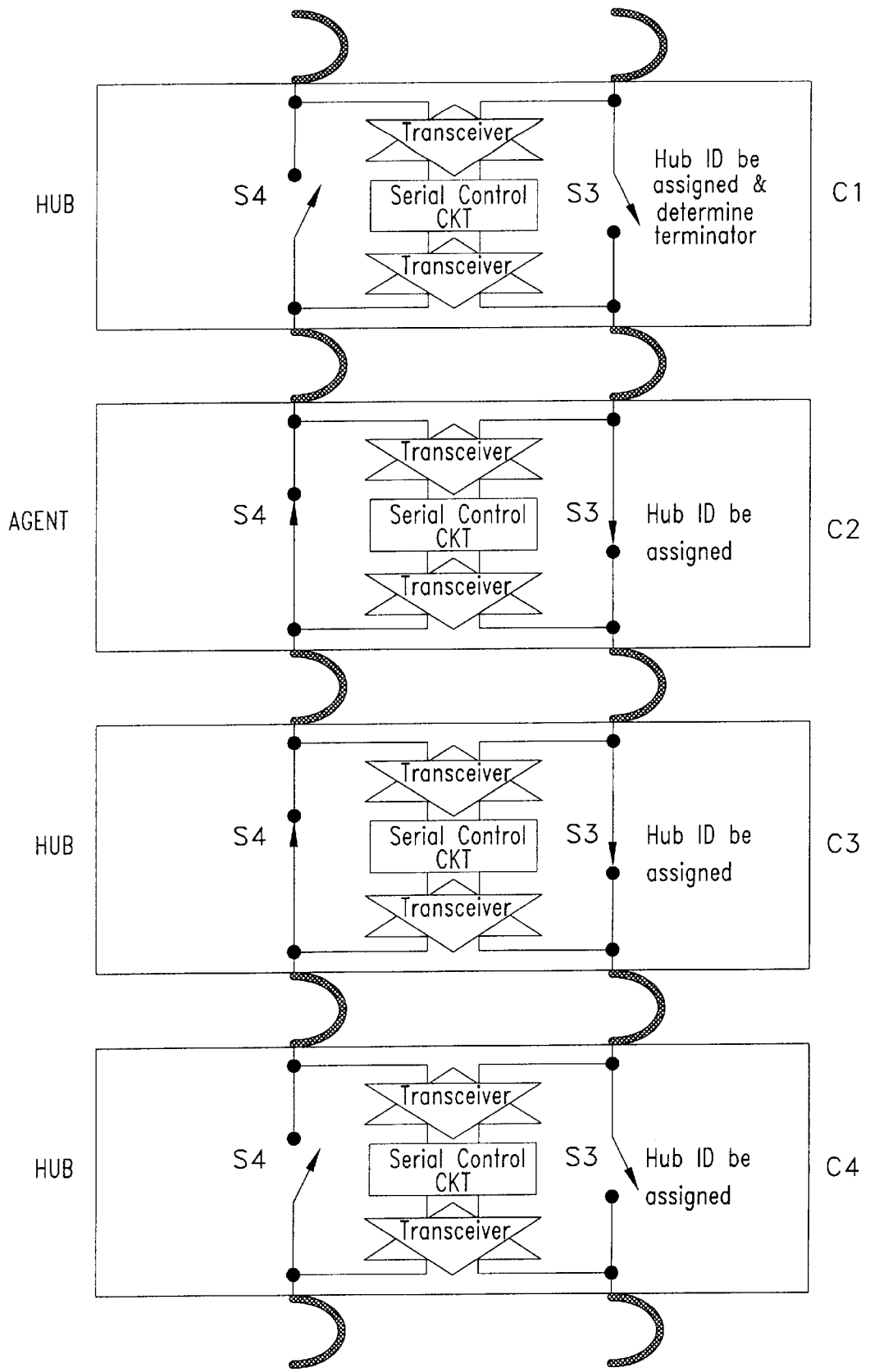
FIG. 17 shows the auto-ID assignment completed in step 5of the management bus architecture depicted in FIG. 12.

Step 5: Please refer to FIG. 17, after receiving the response issued by the concentrator C4, the master concentrator C2 assigns an ID number to itself, and hence the auto-ID assignment polling process for entire stackable concentrators is completed. Finally, every concentrator will have an ID number assigned by the master concentrator C2.

Owing to the fact that the auto-ID assignment is completed by the master concentrator C2, it is assured that every concentrator will have a distinctive ID number and the situation of duplicate ID assignment for the concentrator will not occur.

Figure 24:
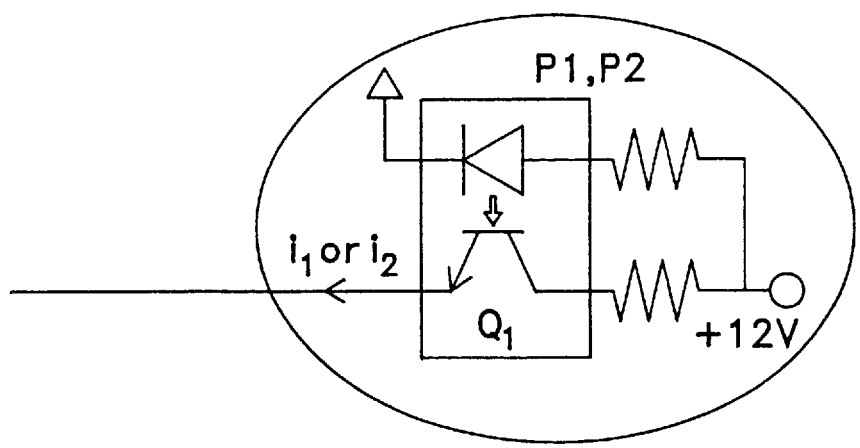
FIG. 24 depicts the implement circuit of the current source P1 and P2 of the concentrator.

FIG. 24 depicts the implement circuit of the current sources P1 and P2 of the concentrator. Whenever, the concentrator is in power-on state, the currents i1 and/or i2 will inform the detectors D1 and/or D2 of other concentrators, respectively. On the contrary, whenever the concentrator is in power-off state, the transistors Q1 and/or Q2 are set in off-state and remain in a high-impedance state. Therefore, there has no any electric current which can be utilized for informing the detectors D1 and/or D2 of other concentrators.

Figure 25:
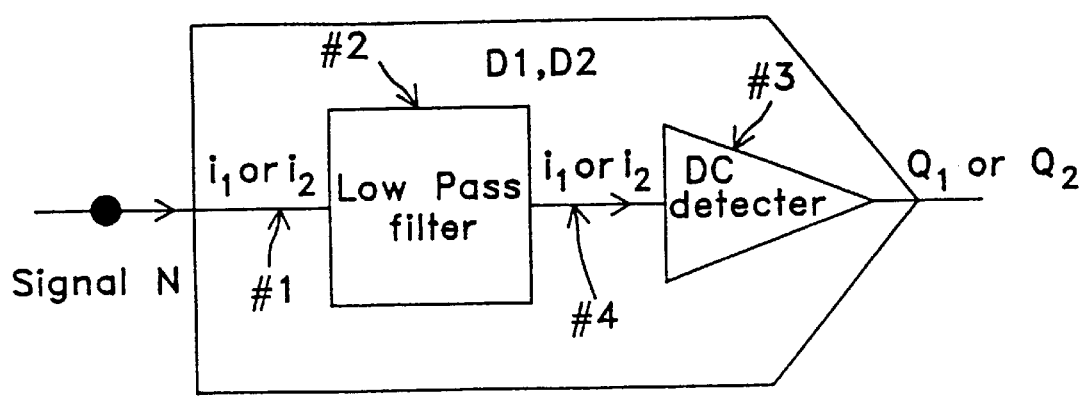
FIG. 25 depicts the implement circuit of the detectors D1 and D2 of the concentrator.

FIG. 25 shows the implement circuit of the detectors D1 and D2 of the concentrator, wherein current $i_1$ or $i_2$ is influenced by an AC signal N generated from the block X shown in FIG. 19, when $i_1$ or $i_2$ is passing through the wire #1. Therefore, a low-passed filter #2 is employed for filtering out the noise N in order to prevent the DC detector #3 from being influenced by the noise N, and only the current $i_1$ or $i_2$ is permitted to pass through the DC detector. In addition, as current $i_1$ or $i_2$ passes through the wire #1, the transistor Q1 or Q2 will be triggered or enabled, respectively. This confirms the existence of the adjacent concentrator is acknowledged by the master concentrator. Otherwise, if the transistor Q1 or Q2 is disabled, it means that the present concentrator is in the terminal state, and the terminator of the network system is enabled in response to the enable-disable operation situation of the transistor Q1 or Q2 of the concentrator, whereas if the transistor Q1 or Q2 is enabled, then the terminator of the network system is disabled.

In accordance with the present invention, the device for setting the terminal state for stackable concentrators mentioned previously, when a concentrator is in power-on state, it will set its switches S in open state in order to let network agent sequentially assign one concentrator an ID number at one time. If the concentrator is in power-off state, the switches S of this concentrator will close its switches S in order that there is any concentrator in power-off state between the agent and a specific concentrator, the signals sent out from the agent can still pass through the intermediate concentrator in power-off state to the specific concentrator that is to be assigned an ID number.

As a result, with the present device and method provided for respectively setting terminal state and ID number for the concentrator, it will not be necessary to assign ID numbers one by one manually, and mistakes will not happen due to a system being tremendous or the change of concentrator number in the system.

Figure 6:
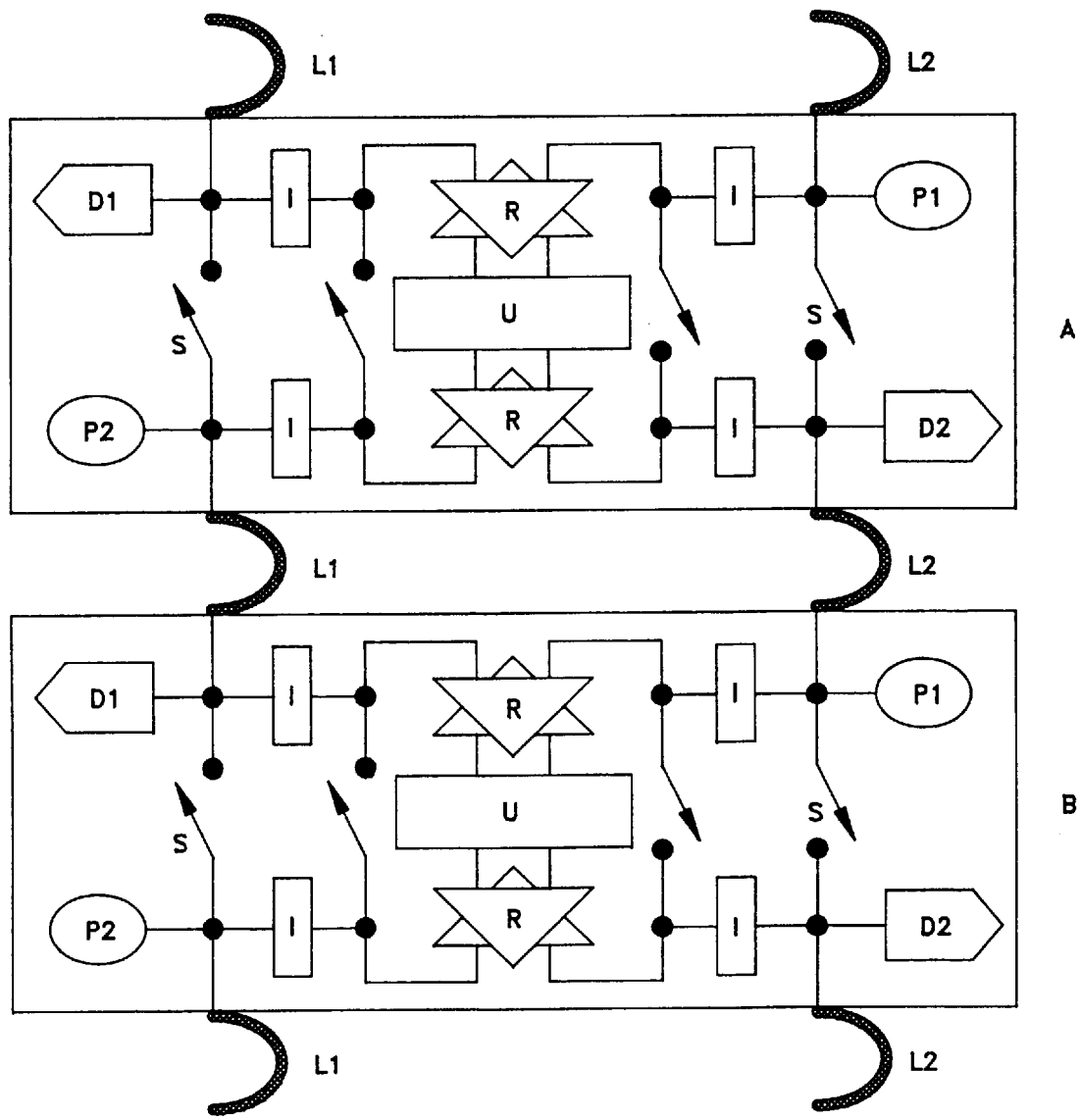
FIG. 6 is a schematic view showing a preferred embodiment of a network system for setting terminal state and assigning ID number for the stackable concentrators therein.

To sum up, after setting terminal states for the concentrators, the ID numbers can thus be assigned with reference to those concentrator terminal states. Referring to FIG. 6, the devices for setting terminal state and for assigning ID number can be provided either separately or integrally. Each of the concentrators A and B includes one first power source detector D1, one first power source generator P1, one second power source generator P2, one second power source detector D2, four isolators I, two transceivers R and two pairs of switches S.

It can be known that for automatic terminal state setting, we require at least two transmission cables for transmitting and detecting the current, and also the hardware construction for the ID number assignment requires at least two cables. Through the theoretical analyses, the function of automatic terminal state setting can be implemented through the detection of the direct current or the direct current voltage; while the automatic ID number assignment can be accomplished through alternating signals, e.g. a signal of communication protocol. In other words, the ID numbers are detected by an alternating current signal, while setting the automatic terminal state is accomplished by a direct current signal. In the present invention, these alternating and directive currents are separated by isolators I in order to let terminal state setting and ID number assignment be implemented by applying only two cables L1 and L2 between every two neighboring concentrators.

It can be concluded that the present method and device for respective automatic terminal state setting and ID number assignment can avoid the laborious manpower required and the time consuming problem in the conventional manual method. Meanwhile, the automatic terminal state setting and ID number assignment can be implemented correctly and swiftly no matter how tremendous the system is or what power state (on/off) of the concentrator will be.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for setting a terminal state for a concentrator in a network including a plurality of said concentrators each of which has two I/O ports comprising the steps of:

(a) automatically setting the terminal state for one of said two I/O ports of said concentrator when said concentrator detects there is no electric signal passing through one of said I/O ports;

(b) causing said two I/O ports of each of said plurality of concentrators including a master one into a mutually open state;

(c) sequentially assigning distinctive ID numbers respectively for said concentrators from said master one to adjacent ones, and simultaneously causing said two I/O ports of one of said concentrators which has been assigned with one of said ID numbers into a mutually connecting state; and (d) reiteratively executing step (c) until all of said plurality of concentrators have been assigned with said ID numbers respectively.

2. A method according to claim 1 wherein in said step c), for a specific concentrator without an ID number, one of said distinctive ID numbers will be assigned for said specific concentrator; while for a particular concentrator with an ID number different from one of said distinctive ID numbers to be newly assigned thereto, then let said particular concentrator maintain said original ID number.

3. A method according to claim 1 wherein in said step c), for a particular concentrator with an ID number to be anew assigned thereto, let said particular concentrator accept said anew assigned ID number.

4. A device for implementing said method according to claim 1 comprising:

a plurality of first power source generators respectively located in said plurality of concentrators in order to provide through a first I/O port of a first active concentrator of said plurality of concentrators in a power-on state for a first adjacent concentrator a power source;

a plurality of first power source detectors respectively located in said plurality of concentrators for detecting whether there is said electric signal provided from said first adjacent concentrator into said first I/O port of said first active concentrator;

a plurality of second power source generators located respectively in said plurality of concentrators in order to provide through a second I/O port of a second active concentrator of said plurality of concentrators at power-on state for a second adjacent concentrator a power source;

a plurality of second power source detectors located respectively in said plurality of concentrators for detecting whether there is said electric signal power source provided from said second adjacent concentrator into second I/O port of said second active concentrator;

a plurality of pairs of switches positioned in said plurality of concentrators respectively and each pair of which includes a first one connected between said first generator and said second detector of said respective concentrator and a second one between said first detector and said second generator of said respective concentrator in order to determine said two I/O ports of said respective concentrator in one of one of said open and connecting states; said master one serving as a network agent device respectively assigning said ID numbers to other said concentrators by alternating current signals representative of a communication protocol;

a plurality of pairs of transceivers located respectively in said plurality of concentrators to function according to said communication protocol; and a plurality of pairs of isolators mounted in said plurality of concentrators respectively and each pair of which includes a first one connected between said respective first power source detector and one of said respective pair of said transceivers and a second one between said one transceiver and said respective first power source generator to prevent said one transceiver from receiving a non-alternating signal.

5. A device according to claim 4 wherein said network agent further includes a memory unit to memorize assigned ID numbers of concentrators in order to avoid said assigned ID number being repeated.

6. A device according to claim 4 wherein each of said first power source generators is a current source.

7. A device according to claim 4 wherein each of said first power source detectors is an electric current detector.

8. A device according to claim 4 wherein each of said first power source generators is a voltage source.

9. A device according to claim 4 wherein each of said first power source detectors is a voltage detector.

10. A device according to claim 4 wherein each of said second power source generators is a voltage source.

11. A device according to claim 4 wherein each of said second power source detectors is a voltage detector.

12. A device according to claim 4 wherein each of said second power source generators is a current source.

13. A device according to claim 4 wherein each of said second power source generators is a current detector.

14. A device mounted in each of said plurality of concentrators for implementing said method according to claim 1 comprising:

a first power source generator, when in a power-on state, through a first one of said two I/O ports, providing a first one of said concentrators adjacent to said each concentrator a power source;

a first power source detector detecting whether there is said electric signal provided from said first adjacent concentrator into said first I/O port;

a second power source generator, when in a power-on state, through a second of said I/O ports providing a second one of said concentrators adjacent to said each concentrator a power source;

a second power source detector detecting whether there is said electric signal provided from said second adjacent concentrator into said second I/O port; and two switches respectively connected between said first power source generator and said second power source detector and between said first power source detector and said second power source generator in order to determine said two I/O ports in one of a mutually breaking and a mutually connecting states.

15. A device according to claim 14 wherein said first power source generator is a current source.

16. A device according to claim 14 wherein said first power source detector is a current detector.

17. A device according to claim 14 wherein said first power source generator is a voltage source.

18. A device according to claim 14 wherein said first power source detector is a voltage detector.

19. A device according to claim 14 wherein said second power source generator is a voltage source.

20. A device according to claim 14 wherein said second power source detector is a voltage detector.

21. A device according to claim 14 wherein said second power source generator is a current source.

22. A device according to claim 14 wherein said second power source detector is a current detector.

23. A method for respectively assigning ID numbers to a plurality of concentrators each of which has two I/O ports in a network system comprising the following steps of:

a) causing said two I/O ports of each of said plurality of concentrators including a master one in a mutually open state;

b) sequentially assigning distinctive ID numbers respectively for said concentrators from said master one to adjacent ones, and simultaneously causing said two I/O ports of one of said concentrators which has been assigned with one of said ID numbers in a mutually connecting state; and c) reiteratively executing steps b) until all of said plurality of concentrators have been assigned with said ID numbers respectively.

24. A method according to claim 23 wherein in said step b), for a specific concentrator without an ID number, one of said distinctive ID numbers will be assigned for said specific concentrator; while for a particular concentrator with an ID number different from one of said distinctive ID numbers to be newly assigned thereto, then let said particular concentrator maintain said original ID number.

25. A method according to claim 23 wherein in said step b), for a particular concentrator with an original ID number to be anew assigned thereto, set said particular concentrator to accept said anew assigned ID number.

26. A device for implementing said method according to claim 23 including:

a network agent device being one said of said plurality of concentrators for respectively assigning said ID numbers to other said concentrators by signals representative of a communication protocol;

a plurality of pairs of switches respectively mounted in said plurality of concentrators for respectively determining said I/O ports of said plurality of said concentrators at one of a mutually open and a mutually connecting states; and a plurality of pairs of transceivers located respectively in said plurality of concentrators for execution according to said communication protocol.

27. A device according to claim 26 wherein said network agent further includes a memory unit to memorize assigned ID numbers of concentrators in order to avoid said assigned ID number being repeated.

28. A device according to claim 26 wherein said signals are alternating signals.

* * * * *